US 8,725,186 B2

(12) United States Patent
Taoka et al.

(10) Patent No.: US 8,725,186 B2
(45) Date of Patent: May 13, 2014

(54) BASE STATION APPARATUS, USER EQUIPMENT AND PRECODING METHOD

(75) Inventors: Hidekazu Taoka, Tokyo (JP); Yuichi Kakishima, Kanagawa (JP); Hiroyuki Kawai, Yokosuka (JP); Kenichi Higuchi, Saitama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 448 days.

(21) Appl. No.: 13/119,901

(22) PCT Filed: Sep. 18, 2009

(86) PCT No.: PCT/JP2009/066339
§ 371 (c)(1),
(2), (4) Date: Jun. 30, 2011

(87) PCT Pub. No.: WO2010/032810
PCT Pub. Date: Mar. 25, 2010

(65) Prior Publication Data
US 2011/0256897 A1    Oct. 20, 2011

(30) Foreign Application Priority Data

Sep. 22, 2008 (JP) ................................ 2008-242857
Oct. 31, 2008 (JP) ................................ 2008-282111

(51) Int. Cl.
*H04B 7/00*    (2006.01)

(52) U.S. Cl.
USPC ........................................................ 455/509

(58) Field of Classification Search
CPC .. H04B 7/0632; H04B 7/0639; H04B 7/0417; H04B 7/0026; H04B 7/0626
USPC ........................................................ 455/509
See application file for complete search history.

(56) References Cited

U.S. PATENT DOCUMENTS

| 8,184,544 | B2 * | 5/2012 | Ko et al. | 370/249 |
| 8,249,511 | B2 * | 8/2012 | Liu et al. | 455/63.1 |
| 8,483,085 | B2 * | 7/2013 | Pan et al. | 370/252 |
| 8,520,494 | B2 * | 8/2013 | Yang et al. | 370/204 |

(Continued)

FOREIGN PATENT DOCUMENTS

| EP | 2 056 506 A1 | 5/2009 |
| JP | 2008-079262 A | 4/2008 |
| WO | 2008/023646 A1 | 2/2008 |
| WO | 2008/032358 A1 | 3/2008 |

OTHER PUBLICATIONS

Texas Instruments, "Uplink SU-MIMO for E-UTRA," 3GPP TSG RAN WG1 53bis, R1-082707, Jun. 30, 2008, 6 pages.

(Continued)

*Primary Examiner* — Bobbak Safaipour
(74) *Attorney, Agent, or Firm* — Osha Liang LLP

(57) ABSTRACT

The present invention provides a base station apparatus capable of preventing degrading of throughput performance even when feedback information amount on precoding in uplink MIMO transmission is reduced. This base station (200) has a scheduler (231) for determining resource blocks used in wireless communications with each mobile station (100) adaptively, a precoding weight selecting section (232) for selecting a precoding weight for controlling phase and/or amplitude of a transmission signal for each antenna in the mobile station (100) based on reception quality on uplink at the resource blocks determined to the mobile station (100); and transmission/reception sections (206a and 206b) for transmitting the determined precoding weight to the mobile station (100).

9 Claims, 18 Drawing Sheets

(56) References Cited

U.S. PATENT DOCUMENTS

| 2008/0303701 | A1* | 12/2008 | Zhang et al. | 341/106 |
| 2009/0052405 | A1* | 2/2009 | Ko et al. | 370/335 |
| 2009/0196272 | A1 | 8/2009 | Tsutsui | |
| 2009/0325591 | A1* | 12/2009 | Liu et al. | 455/452.2 |
| 2010/0046445 | A1 | 2/2010 | Sawahashi et al. | |
| 2010/0284351 | A1* | 11/2010 | Liang et al. | 370/329 |
| 2011/0096658 | A1* | 4/2011 | Yang et al. | 370/210 |
| 2012/0201165 | A1* | 8/2012 | Ko et al. | 370/252 |
| 2013/0114513 | A1* | 5/2013 | Taoka et al. | 370/329 |

OTHER PUBLICATIONS

3GPP TS 36.213 V8.3.0, May 2008, "UE procedure for reporting channel quality indication (CQI), precoding matrix indicator (PMI) and rank indication (RI)," pp. 24-29, 6 pages.

NTT DoCoMo, et al., "Investigation on PMI Indication Schemes for Single-User MIMO Precoding in E-UTRA Downlink," 3GPP TSG RAN WG1 Meeting #51bis, R1-080248, Jan. 14, 2008, 8 pages.

NTT DoCoMo, et al., "Investigation on PMI Indication Schemes for Single-User MIMO Precoding in E-UTRA Downlink," 3GPP TSG RAN WG1 Meeting #52, R1-081037, Feb. 11, 2008, 8 pages.

H. Taoka, et al., "Evolved UTRA Kudari Link ni Okeru Preceding o Mochiiru MIMO Channel Denso ni Tekishita Reference Signal Kosei," IEICE Technical Report, Jul. 12, 2008, pp. 131 to 136, RCS2007-51, 8 pages.

3GPP TS 36.211 V8.3.0 May 2008, Evolved Universal Terrestrial Radio Access (E-UTRA), Physical Channels and Modulation, 77 pages.

3GPP TR 25.913 V8.0.0, Dec. 2008, "Requirements for Evolved UTRA (E-UTRA) and Evolved UTRAN (E-UTRAN)," 18 pages.

3GPP TS 36.101 V8.2.0, May 2008, "Evolved Universal Terrestrial Radio Access (E-UTRA); User Equipment (UE) radio transmission and reception," 66 pages.

International Search Report issued in PCT/JP2009/066339, mailed on Nov. 2, 2009, 2 pages.

ETSI TS 136 213 V8.3.0; "LTE; Evolved Universal Terrestrial Radio Acces (E-Utra); Physical Layer Procedures" (3GPP TS 36.213 version 8.3.0 Release 8); Nov. 2008 (47 pages).

Office Action in corresponding Japanese Application No. 2010-529800, mailed May 21, 2013 (5 pages).

Office Action in corresponding Chinese Application No. 200980136962.7, mailed Apr. 3, 2013 (6 pages).

* cited by examiner

BASE STATION APPARATUS, USER EQUIPMENT AND PRECODING METHOD

TECHNICAL FIELD

The present invention relates to a base station apparatus, a user equipment and a precoding method for antenna-by-antenna closed loop control of the phase and amplitude of a transmission signal in uplink multi-antenna transmission, and particularly, in MIMO (Multiple Input Multiple Output) multiplexing transmission, or transmission diversity transmission.

BACKGROUND ART

Long Term Evolution (LTE), which is a succeeding communication system to W-CDMA (Wideband Code Division Multiple Access), HSDPA (High Speed Downlink Packet Access) and HSUPA (High Speed Uplink Packet Access), has been considered in the W-CDMA standards body (3GPP: Third Generation Partnership Project) and its specifications are now being developed. As a wireless access system in LTE, there are specified the OFDMA (Orthogonal Frequency Division Multiplexing Access) system for the downlink and the SC-FDMA system (Single-Carrier Frequency Division Multiple Access) for the uplink (for example, see Non-Patent Literature 1).

The OFDMA system is a multicarrier transmission system in which a frequency band is divided into plural narrower frequency bands (subcarriers) and data is transmitted on each subcarrier. The subcarriers are arranged orthogonal onto the frequency axis and close to each other and thereby, high-speed transmission is realized and the frequency usage efficiency is expected to be increased.

The SC-FDMA system is a single carrier transmission system in which a frequency band is divided and assigned to terminals and the terminals use different frequency bands in transmission. This system is preferable in terms of lower power consumption of the terminals, wider coverage and the like as interference between the terminals can be reduced simply and effectively and fluctuations in transmission power can be reduced.

In the LTE system, one or more resource blocks are assigned to a mobile station for communications on both of the uplink and downlink. The base station apparatus determines to which mobile station out of plural mobile stations and which resource block to assign for each sub-frame (1 ms in LTE) (this process is called frequency scheduling). In the downlink, the base station apparatus transmits a shared channel to the scheduled mobile station in one or more resource blocks. In the uplink, the selected mobile station transmits a shared channel to the base station apparatus in one or more resource blocks. Here, the shared channel is a PUSCH (Physical Uplink Shared Channel) in the uplink and a PDSCH (Physical Downlink Shared Channel) in the downlink.

Here, there has been proposed a MIMO antenna system, as wireless communication technique, in which data transmission and reception is performed with plural antennas to improve throughput and frequency usage efficiency (for example, see Non-Patent Literature 2). In the LTE system, there are two downlink MIMO modes, that is, space-division multiplexing transmission mode (SU-MIMO: Single User MIMO) and transmission diversity transmission mode. In the space-division multiplexing transmission mode, plural stream signals are spatially multiplexed and transmitted at the same frequency and time, and this is effective in increase in peak data rate. In the transmission diversity transmission mode, a space-frequency (time) encoded stream signal is transmitted from plural antennas. This is effective in improvement of reception quality of cell edge users due to transmission antenna diversity effects.

In the downlink MIMO transmission, in order to increase signal power at the mobile station receiver and improve the throughput performance, when a transmission signal is transmitted via each of plural antennas in the base station transmitter, the phase and/or amplitude of the transmission signal is controlled with respect to each antenna basis (hereinafter, this is referred to as "precoding").

In the LTE system, at a mobile station receiver, a reception signal from each transmission antenna is used to measure a channel variance and this channel variance is used as a basis to select such a PMI (Precoding Matrix Indicator) to set at an antenna of a base station transmitter that the throughput or reception SINR (Signal to Interference plus Noise Power Ratio) becomes maximum. And this selected PMI is fed back to the base station transmitter. The base station transmitter performs precoding based on the PMI given from the mobile station receiver and then, transmits signals from antennas.

In the above-mentioned MIMO transmission, the channel variance is measured as to all frequency bands of the system bandwidth at the mobile station receiver and the average of reception quality of all frequency bands is obtained to select one PMI, or the system bandwidth is divided into plural sub-bands and an optimal PMI is selected for each of the sub-bands. The selected PMI is fed back to the base station transmitter on the uplink. In order to improve the throughput performance, it is necessary to increase the number of divided bands of the system bandwidth so as to increase the number of PMIs to feed back (feedback information amount).

CITATION LIST

Non-Patent Literature

NPL1: 3GPP TS 36.211 (V8.3.0), "Physical Channels and Modulation", May 2008
NPL2: 3GPP TR 25.913
NPL3: 3GPP TS36.101 (V8.2.0), "E-UTRA UE radio transmission and reception"

SUMMARY OF INVENTION

Technical Problem

The above-given description relates to downlink MIMO transmission in which a PMI is fed from a mobile station receiver back to a base station transmitter. Meanwhile, in uplink MIMO transmission, PMI information about plural antennas mounted on a mobile station transmitter is fed back to the mobile station transmitter from a base station receiver. In this feedback, it is assumed that whole of the system bandwidth is used to select one or plural pieces of PMI in the same way as the precoding method adopted in the downlink MIMO transmission. Then, if the bandwidth in selecting of PMI is wider, the performance is degraded and if the bandwidth is narrower, PMI is increased with increase in feedback information, which presents a problem.

In view of the above-mentioned problem, the present invention has an object to provide a base station apparatus, a user equipment and a precoding method, capable of minimizing degradation of the throughput performance even if the amount of feedback information for precoding in the uplink MIMO transmission is smaller than that in the downlink MIMO transmission.

Solution to Problem

A base station apparatus according to an aspect of the present invention is characterized by comprising: a resource determining section for determining a resource block used in wireless communications with each user equipment adaptively; a PMI determining section for determining a PMI for controlling phase and/or amplitude of a transmission signal of each antenna of the user equipment based on reception quality of uplink at the resource block determined for the user equipment; and a transmitter for transmitting the PMI determined by the PMI determining section to the user equipment.

According to this structure, as the base station apparatus determines a PMI of a transmission signal for uplink multi-antenna transmission only based on a resource block selected for the user equipment, the bandwidth of the resource block is greatly narrower than the system bandwidth and it become possible to reduce the feedback information for precoding while minimizing degradation of the throughput performance.

Technical Advantage of the Invention

According to the present invention, it is possible to provide a precoding method, a base station apparatus and a user equipment capable of preventing degradation of throughput performance even when the amount of feedback information on precoding is reduced in the uplink MIMO transmission.

DESCRIPTION OF EMBODIMENTS

Figure 1:
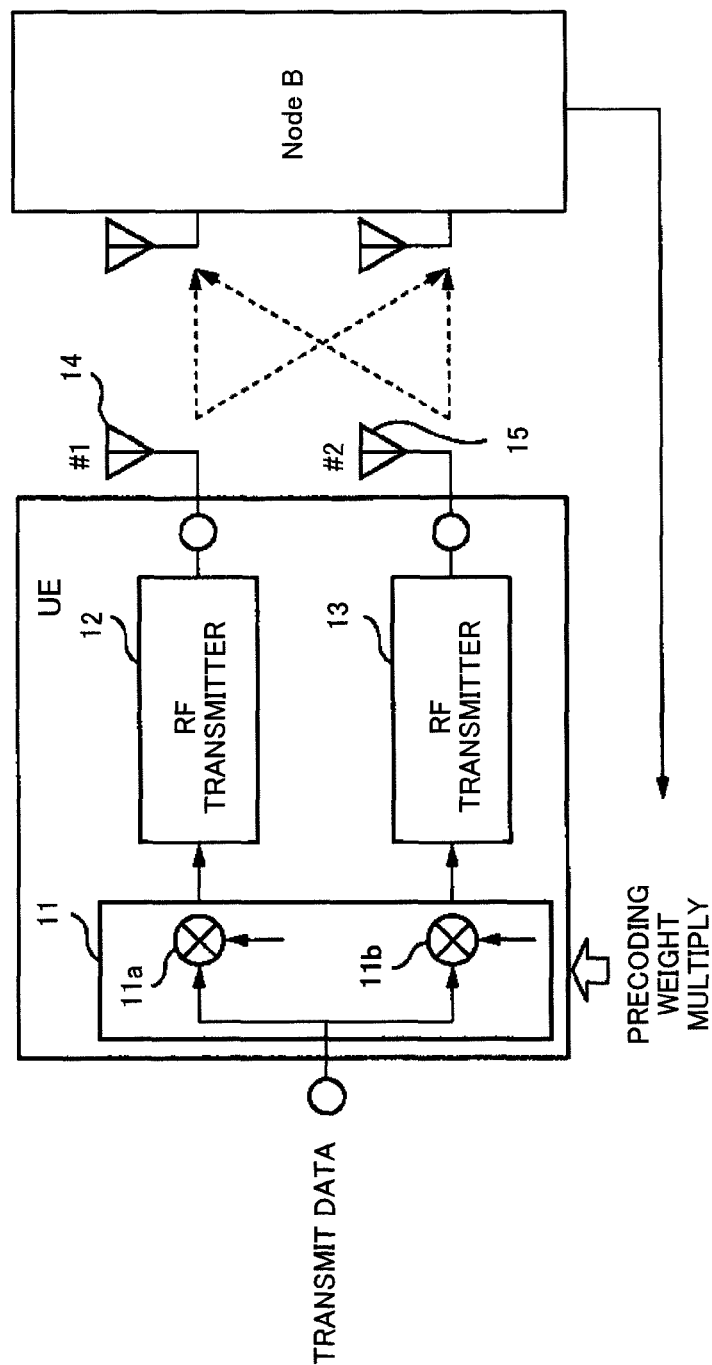
FIG. 1 is a conceptual view of a MIMO system to which the present invention applies.

In the following description, the MIMO system illustrated in FIG. 1 is used as a basis to explain precoding in the uplink MIMO transmission. In the example of FIG. 1, each of the user equipment UE and the base station apparatus Node B has two antennas. Here, the present invention is also applicable to the MIMO system having three or more antennas. In the base station apparatus Node B, a reception signal from each transmission antenna is used to measure a channel variance. Then, the measured channel variance is used to select such a PMI (Precoding Matrix Indicator) (precoding weight) that the throughput (or reception SINR) after combining of transmission antennas is maximized. The base station apparatus Node B notifies the user equipment UE of selected precoding information on the downlink.

Here, the user equipment UE and the base station apparatus Node B have a codebook consisting of given N precoding weights. The reception side selects an optimal one from the N precoding weights of the codebook and feeds only an index (number) of the precoding weight back to the transmission side. In the present invention, transmission of PMIs conceptually includes transmission of precoding weights themselves and transmission of indexes (numbers) only.

The user equipment UE has two multipliers 11a, 11b, and radio transmission circuits 12, 13 corresponding to two transmission antennas #1, #2, respectively. Transmission data is input to a precoding multiplier 11 and multiplied by a precoding weight at the multipliers 11a, 11b so that the phase and amplitude are controlled (shifted). The phase/amplitude shifted transmission data is transmitted via the two transmission antennas #1, #2.

Here, the base station apparatus Node B performs scheduling for assigning resource blocks to user equipment UE and selecting of information regarding precoding to feed back to the user equipment UE. In the uplink MIMO transmission, the scheduled resource blocks are only used to select an optimal precoding weight.

Figure 2:
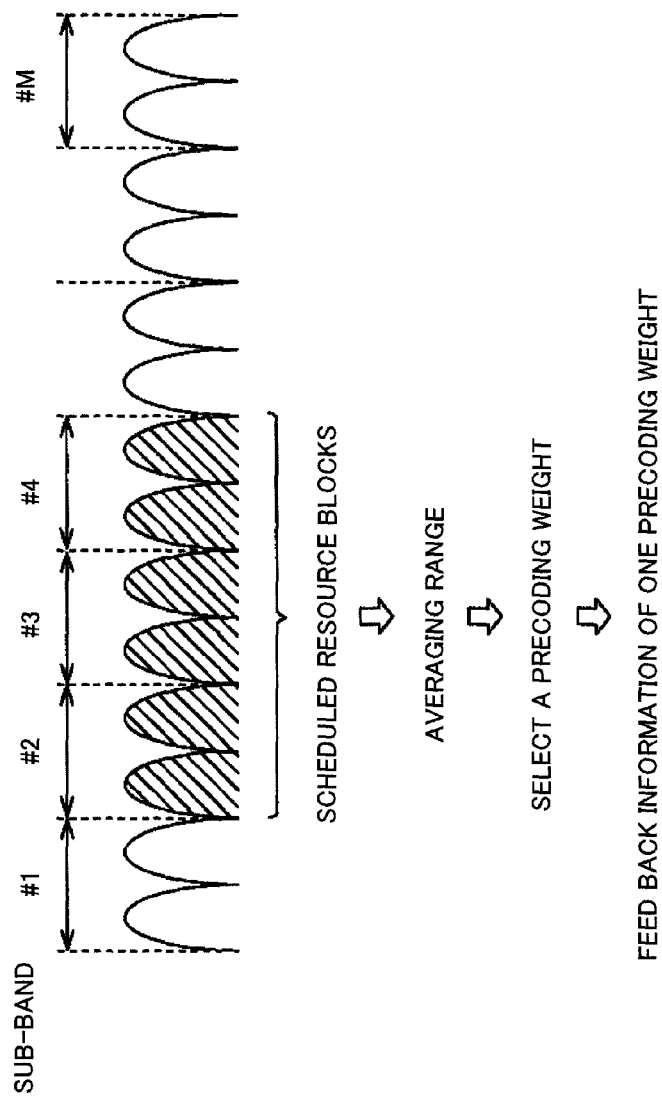
FIG. 2 is a conceptual view of a precoding method of feeding back shared precoding information.

The next description is made, with reference to FIGS. 2 to 14, about a precoding method for the uplink MIMO transmission in the base station apparatus. FIG. 2 is a conceptual view of the precoding method for feeding back shared precoding information. A system bandwidth shown in FIG. 2 is made up of sub-bands #1 to #M. In FIG. 2, the base station apparatus Node B assigns shaded sub-bands #2 to #4 to the user equipment UE as resource blocks. In one aspect of the present invention, averaging is made of the scheduled resource blocks #2 to #4 to select an optimal PMI. The base station apparatus Node B transmits the user equipment UE only information regarding the one selected precoding on the downlink. Then, it does not need to transmit positional information as the precoding information (information indicating the resource blocks #2 to #4). The positional information for identifying sub-bands targeted for averaging is the same as the numbers of the scheduled resource blocks for the user equipment UE. The numbers of the scheduled resource blocks are sent to the user equipment UE as resource assignment information separately from the precoding information. Accordingly, the user equipment UE can recognize the positional information from the resource assignment information.

In addition, the base station apparatus Node B measures reception quality of a reference signal received from the user equipment UE in scheduling. Selection of a precoding weight for the uplink MIMO transmission includes averaging of reception quality of resource blocks assigned to the user equipment UE. The base station apparatus Node B recognizes the reception quality of the resource blocks when the resource blocks are assigned to the user equipment UE. Accordingly, the base station apparatus Node B can perform scheduling and selecting of the precoding weight simultaneously.

In this way, as the information on shared precoding obtained by averaging of only resource blocks assigned to the user equipment UE is fed back to the user equipment UE as precoding information, the bandwidth for averaging to select the precoding information is drastically reduced, as compared with the precoding method of averaging of the whole system bandwidth to feed information on shared precoding back to the user equipment UE. Therefore, improvement of the throughput performance can be achieved.

Besides, as the numbers of resource blocks assigned to the user equipment UE are sent to the user equipment UE as the resource assignment information, it becomes unnecessary to send the positional information of sub-bands which is the same as the resource block numbers, thereby reducing the number of feedback bits for precoding.

Figure 3:
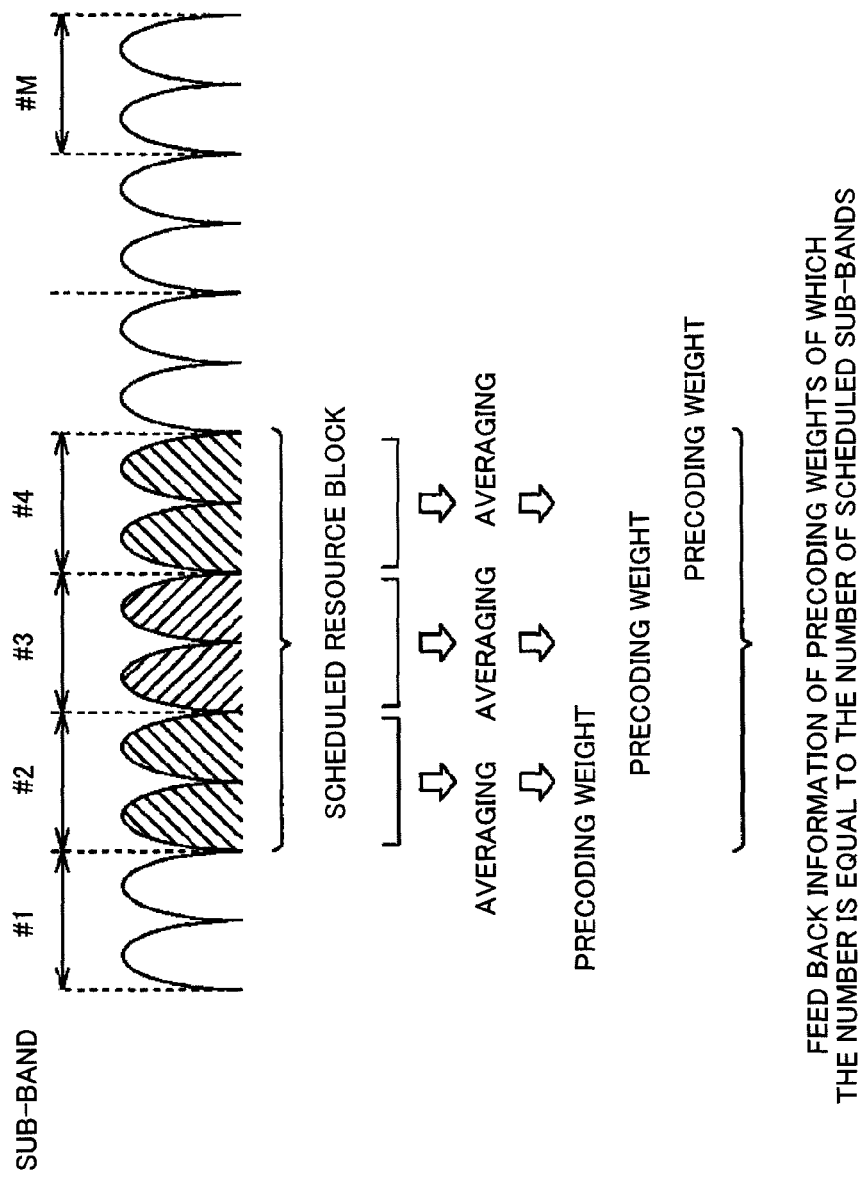
FIG. 3 is a conceptual view of a precoding method of feeding back optimal precoding information for each sub-band.

FIG. 3 is a conceptual view of the precoding method for feeding back optimal precoding information of each sub-band. In FIG. 3, the base station apparatus Node B assigns the shaded sub-bands #2 to #4 as resource blocks to the user equipment UE. In this different aspect of the present invention, optimal precoding information is selected for each of the sub-bands #2 to #4 that constitute the scheduled resource blocks. The bandwidth for averaging in selecting optimal precoding information is a bandwidth of one sub-band. The base station apparatus Node B transmits to the user equipment UE, three precoding information pieces of the respective sub-bands #2, #3, #4 of the scheduled resource blocks on the downlink.

The number of sub-bands contained in the resource bocks to assign to the user equipment UE is very smaller than the number of sub-bands contained in the whole system bandwidth. If an optimal precoding weight is selected on each of the sub-bands contained in the resource blocks assigned to the user equipment UE, the amount of precoding information is smaller than that of the number of sub-bands of the whole system bandwidth. Therefore, the number of feedback bits can be reduced. Further, as the optimal precoding weight is selected by averaging of each sub-band of narrowest bandwidth, the throughput performance can be improved.

Figure 4:
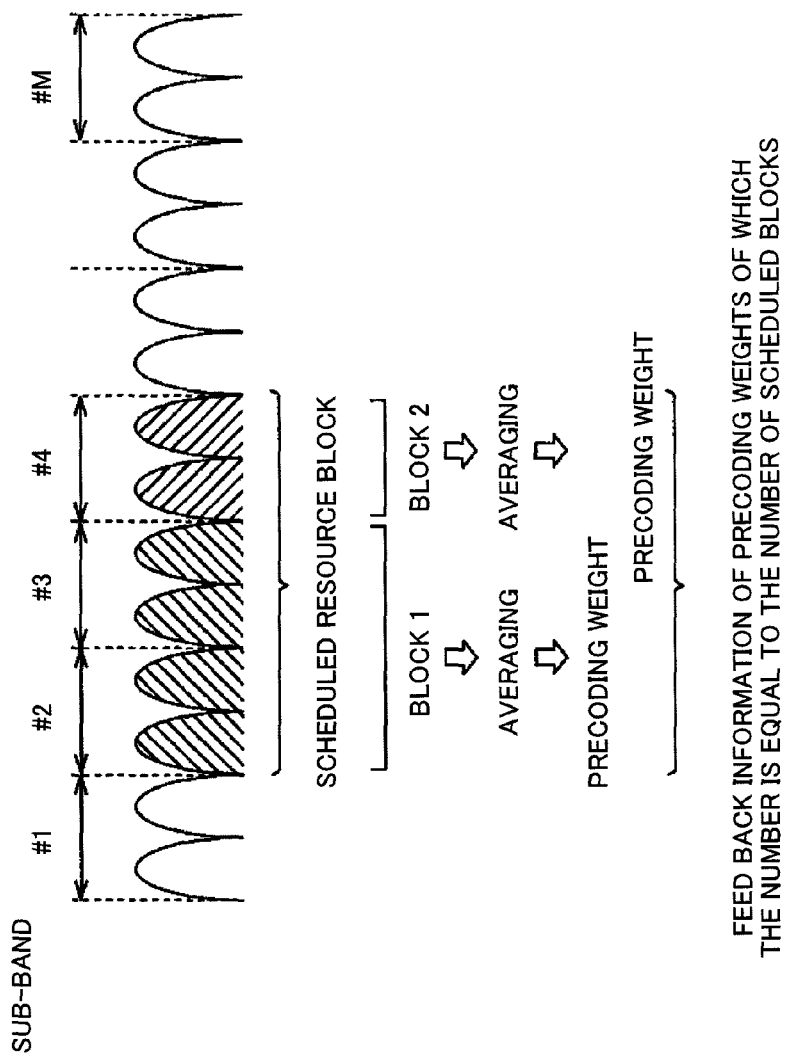
FIG. 4 is a conceptual view of a precoding method of feeding back optimal precoding information for each block consisting of one or more sub-bands.

FIG. 4 is a conceptual view of the precoding method for feeding back information on optimal precoding for each block made up of one or plural sub-bands. In FIG. 4, the base station apparatus Node B assigns the shaded sub-bands #2 to #4 as resource blocks to the user equipment UE. In this different aspect of the present invention, L sub-bands that make up the resource blocks may be divided into K blocks (K: fixed value) so as to select an optimal precoding weight for each block. In FIG. 4, the resource blocks of the sub-bands #2 to #4 are divided into two, that is, the first block including the sub-bands #2 and #3 and the second block including the sub-band #4 (K=2). The base station apparatus Node B selects an optimal precoding weight by averaging of the bandwidth of the sub-bands #2 and #3 of the first block and also selects an optimal precoding weight by averaging of the bandwidth of the sub-band #4 of the second block. The base station apparatus Node B transmits the precoding information of the first block and the precoding information of the second block to the user equipment UE on the downlink. The number of precoding information pieces to transmit to the user equipment UE is equal to the block division number (K). Accordingly, the number of precoding information pieces to feed back to the user equipment UE is fixed. The user equipment UE can always perform precoding with the fixed number of precoding information pieces. Here, the value K to determine the block division number may be a variable or semi-variable value.

In this way, as the resource blocks scheduled to the user equipment UE are divided into K blocks and an optimal precoding weight is selected on each of the blocks, the performance can be improved as compared with the case when averaging is performed of each band in the resource blocks. Further, the value K to determine the block division number is fixed, the number of feedback bits of the precoding information can be fixed irrespective of the number of sub-bands in the scheduled resource blocks.

Figure 5:
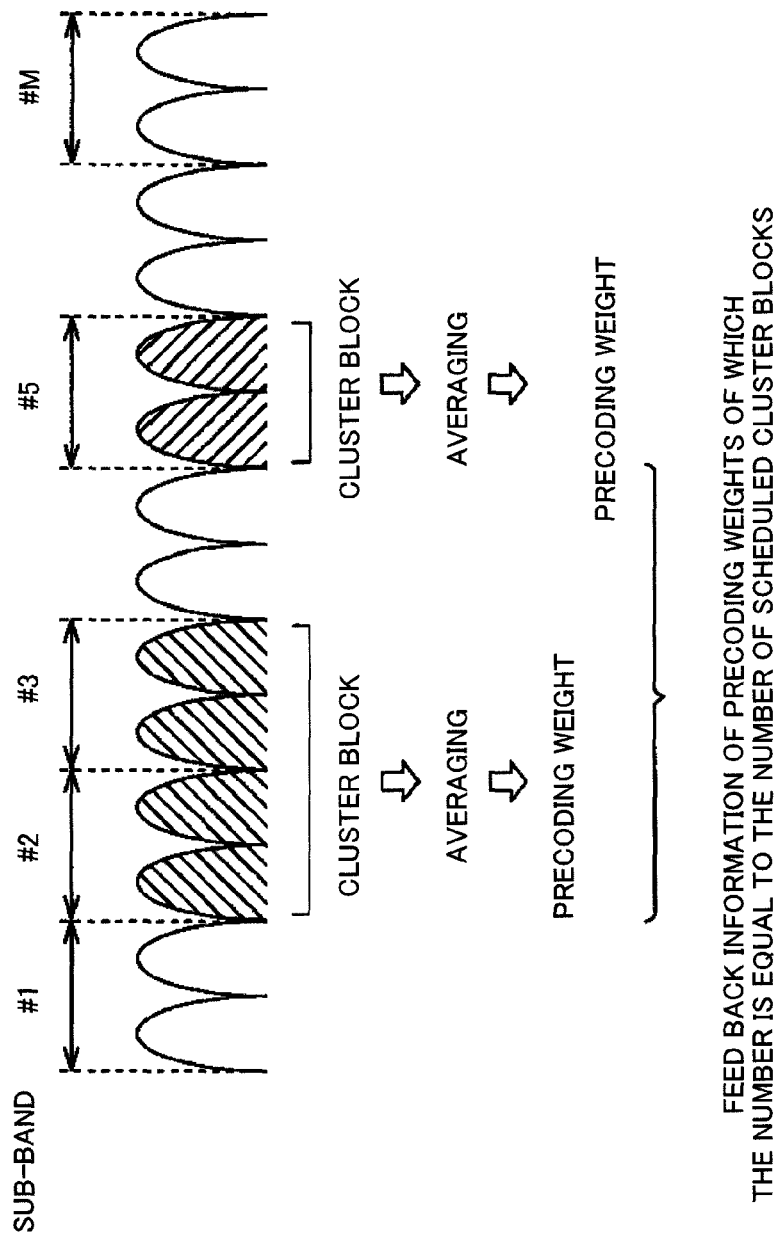
FIG. 5 is a conceptual view of a precoding method of feeding back optimal precoding information for each cluster block.

FIG. 5 is a conceptual view of the precoding method of selecting an optimal precoding weight on each cluster block and feeding back information on the precoding weight. In FIG. 5, the base station apparatus Node B assigns the shaded sub-bands #2, #3, #5 as cluster resource blocks to the user equipment UE. As illustrated in FIG. 5, when the scheduled resource blocks are divided into mutually separated plural "clusters of sub-bands", such a "cluster of sub-bands" consisting of one or plural sub-bands is called "cluster block". The "sub-band cluster" consisting of sub-bands #2 and #3 is the first cluster block and the "sub-band cluster" consisting of the sub-band #5 is the second cluster block. In this different aspect of the present invention, an optimal PMI is selected on each cluster block. The base station apparatus Node B transmits precoding information of the first cluster block and precoding information of the second cluster block to the user equipment UE on the downlink. The number of precoding information pieces to transmit to the user equipment UE is equal to the number of cluster blocks (K). If the value K is a fixed value, the number of precoding information pieces to feed back to the user equipment UE is fixed. The user equipment UE can always perform precoding with fixed number of PMIs. Here, the value K to determine the block division number may be a variable or semi-variable value.

In this way, when the resource blocks scheduled to the user equipment UE are of plural cluster blocks, the optimal precoding weight is selected on each cluster block and therefore, the performance can be improved as compared with the case where averaging is performed of each band in the resource blocks. Besides, as the value K to determine the cluster block division number is fixed, the number of feedback bits of the precoding information becomes fixed irrespective of the number of sub-bands in the scheduled resource blocks.

Figure 6:
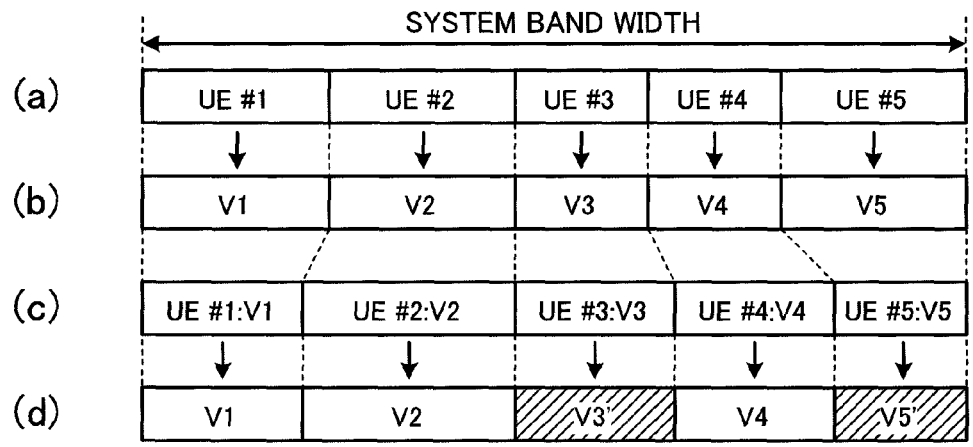
FIG. 6 is a conceptual view of a precoding method having combination of scheduling and selecting of a precoding weight.

FIG. 6 is a conceptual view of the precoding method to determine the optimal precoding weight by repeating scheduling and selecting of the precoding weight. The base station apparatus Node B performs scheduling based on a sum of power of reception signals from respective transmission antennas with disregard to the precoding. FIG. 6(a) illustrates bands assigned to the user equipment UE#1 to UE#5 by scheduling. Next, an optimal precoding weight is selected on each of the assigned bands. FIG. 6(b) illustrates precoding weights V1 to V5 selected to the scheduled bands (user equipment UE#1 to UE#5). Thus, the shared precoding weight is selected in each of bands assigned by scheduling.

Next, scheduling is performed again in consideration of the precoding weights of the user equipment UE#1 to UE#5 illustrated in FIG. 6(b). FIG. 6(c) is a view illustrating a result of this scheduling in consideration of the precoding weights. As the precoding weight is selected on each of the user equipment UE#1 to UE#5, communication conditions are changed from the time when simple scheduling is performed based on the sum of power of reception signals from the transmission antennas. Then, as described above, the second scheduling is performed in consideration of the precoding weight.

Next, a precoding weight is selected again on each of the bands assigned by the second scheduling. FIG. 6(d) is a view illustrating a result of second selection of the precoding weights. The precoding weight of the user equipment UE#3 is changed to V3' and the precoding weight of the user equipment UE#5 is changed to V5'.

Thus, as scheduling in consideration of the precoding weights and selection of the precoding weights are repeated M times, the more appropriate precoding weight can be determined on each of bands assigned to the user equipment UE#1 to UE#5. The number of repetitions M may be a fixed number such as 2 or 3, or repeating may be continued until the same precoding weights are selected successively.

Here, a simple precoding method may be adopted that is combination of only scheduling without consideration of precoding and precoding of each band.

Figure 7:
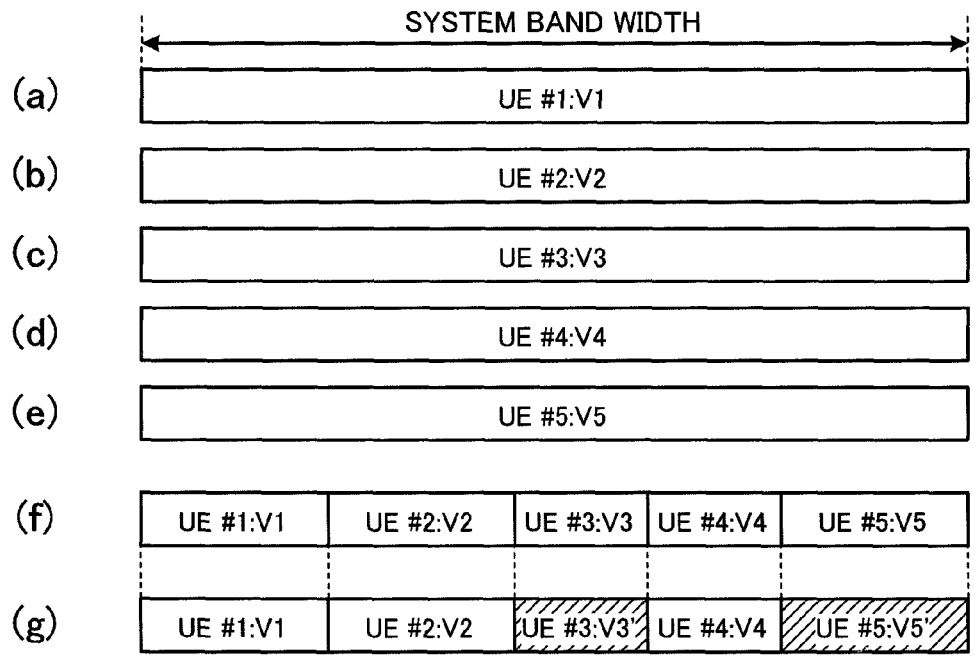
FIG. 7 is a conceptual view of a precoding method of selecting a precoding weight for the whole system bandwidth before scheduling.

FIG. 7 is a conceptual view of the precoding method of selecting one precoding weight roughly over the whole system bandwidth for each user equipment and then scheduling in consideration of the selected precoding weight. The base station apparatus Node B in advance selects such a precoding weight that the reception SINR becomes maximized over the whole system bandwidth for each user equipment UE. FIGS. 7(a) to 7(e) illustrate precoding weights V1 to V5 selected for the user equipment UE#1 to UE#5, respectively.

Next, scheduling is performed in consideration of the precoding weights of the respective user equipment UE#1 to UE#5 illustrated in FIGS. 7(a) to 7(e). That is, weighting is performed with the previously selected precoding weights V1 to V5 and bands are assigned to the user equipment UE#1 to UE#5 based on the reception SINRs of the reception signals of the user equipment UE#1 to UE#5. FIG. 7(f) is a view illustrating bands assigned to the user equipment UE#1 to UE#5 by scheduling in consideration of the precoding weights.

In order to determine locally whether the already selected precoding weight in each band assigned in the above-mentioned scheduling is optimal or not, the precoding weight is selected again. The precoding weight is selected in such a manner that the reception SINR or expected throughput is maximized in the bands assigned to the user equipment UE#1 to UE#5. FIG. 7(g) is a view illustrating optimal precoding weights selected for respective bands. The precoding weights V3', V5' selected for the bands of the user equipment UE#3 to UE#5 are changed from the precoding weights V3, V5 that are selected by averaging of the whole system bandwidth.

Here, as illustrated in FIG. 7(g), a precoding weight may be determined again for each band assigned to the user equipment after the first precoding weight is selected and then the scheduling is performed in consideration of the precoding weight.

Figure 8:
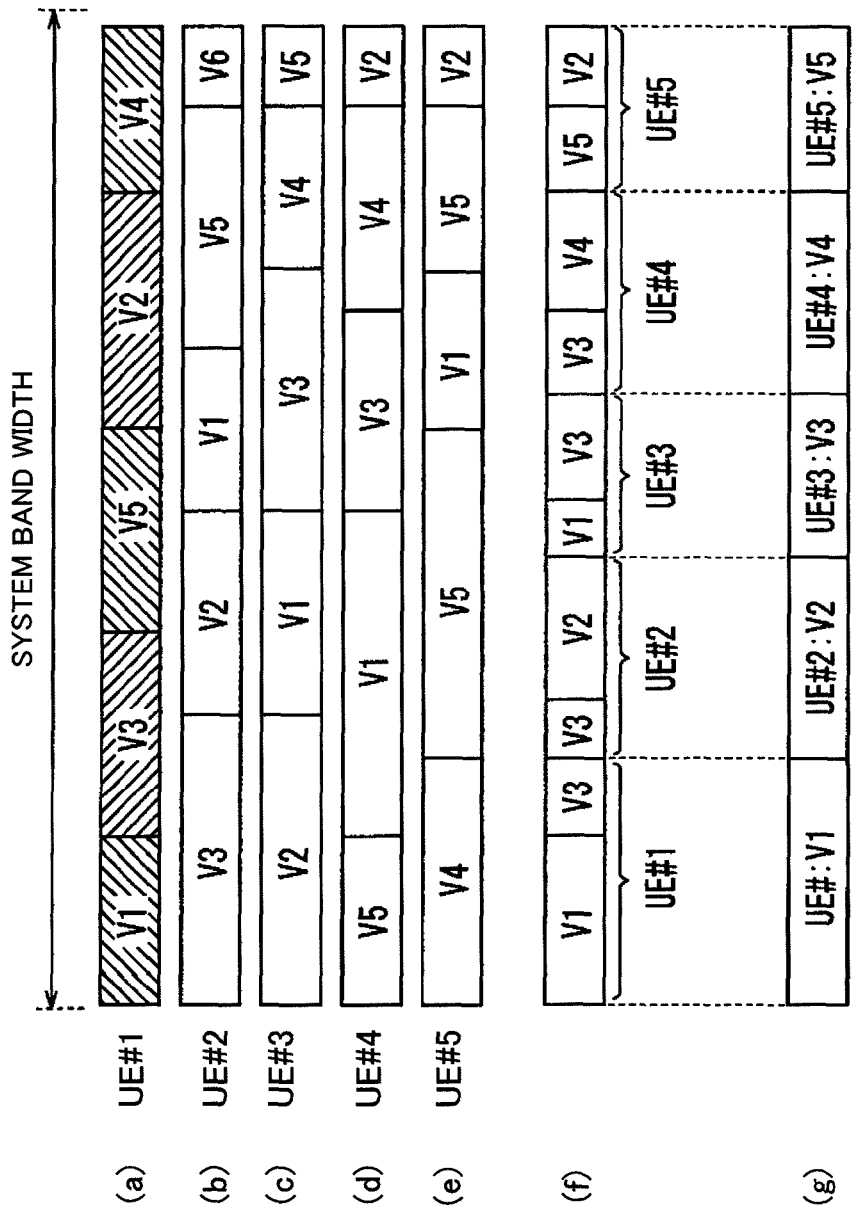
FIG. 8 is a conceptual view of a precoding method of selecting a precoding weight for each resource block or sub-band before scheduling.

FIG. 8 is a conceptual view of the precoding method of selecting a precoding weight of each resource block or sub-band over the system bandwidth for each user equipment and scheduling in consideration of the selected precoding weight. The base station apparatus Node B selects the optimal precoding weight of each resource block or sub-band over the system bandwidth for each user equipment UE. According to this method, such plural precoding weights as to realize higher reception SINRs can be selected as compared with the case of selecting one precoding weight of high reception SINR by averaging over the system bandwidth. FIGS. 8(a) to 8(e) illustrates the precoding weights V1 to V5 selected for respective sub-bands of the use devices UE#1 to UE#5.

Next, scheduling is performed in consideration of the precoding weights of the user equipment UE#1 to UE#5 illustrated in FIGS. 8(a) to 8(e). As there is the reception SINRs obtained for the precoding weights selected for the sub-bands of each of the user equipment UE#1 to UE#5, the band assignment to the user equipment UE#1 to UE#5 is performed in such a manner that the reception SINR becomes highest. FIG. 8(f) is a view illustrating bands to assign to each of the user equipment UE#1 to UE#5 by scheduling in consideration of the precoding weights. In some of the bands assigned to the user equipment UE, different precoding weights are selected between sub-bands.

The optimal precoding weight is selected in the band assigned to each user equipment UE by the above-mentioned scheduling. FIG. 8(g) is a view illustrating the optimal precoding weight selected in each band. For example, for the user equipment UE#1, the precoding weights V1 and V3 are selected for the assigned band. As the reception SINR of the precoding weight V1 is higher than that of the precoding weight V3, the precoding weight V1 is selected for the band finally assigned to the user equipment UE#1.

Here, the precoding weight may be determined again after the precoding weight is selected for each of the bands assigned to the user equipment as illustrated in FIG. 8(g) and scheduling is performed again in consideration of the precoding weights. In this process, as one precoding weight is selected from plural precoding weights multiplexed to the band assigned to the user equipment, if the reception SINR is lowered locally, another optimal precoding weight is selected finally.

Figure 9:
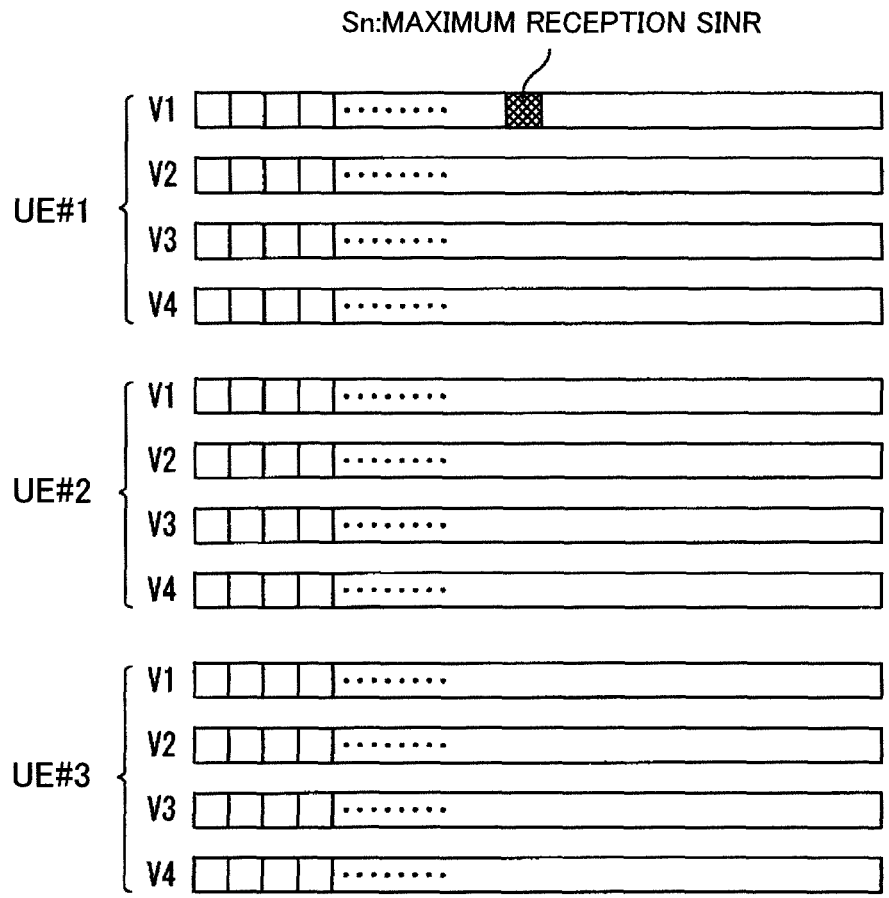
FIG. 9 is a view illustrating a result of calculation of a reception SINR for each precoding weight of every user equipment.
Figure 10:
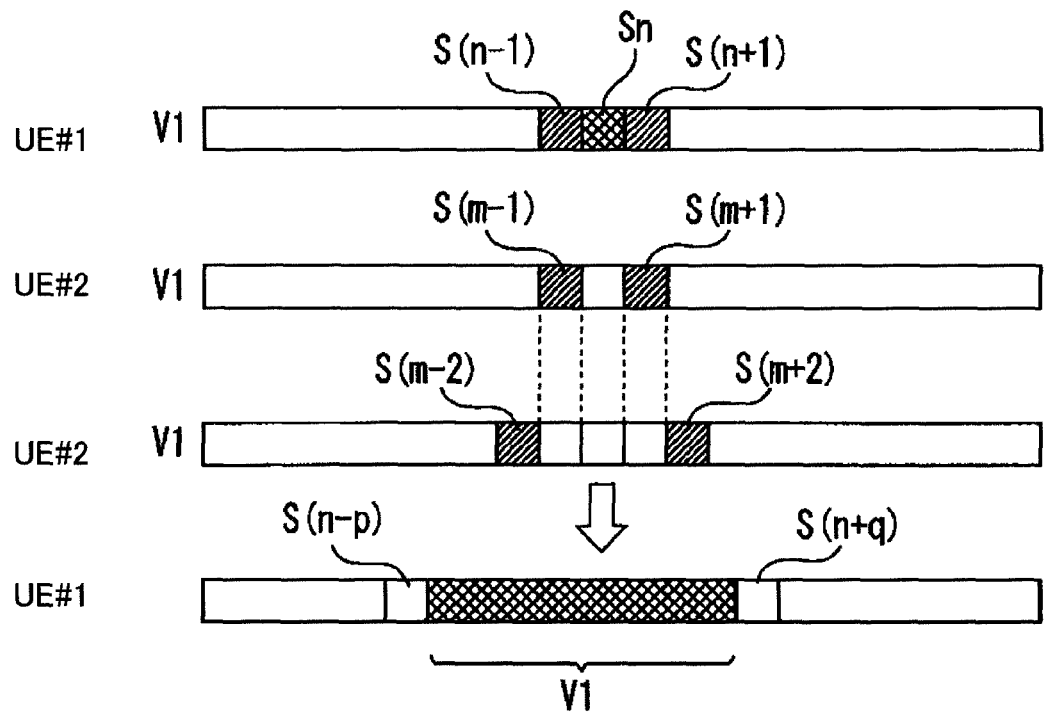
FIG. 10 is a view illustrating a process of assigning a band to a first user equipment.
Figure 11:
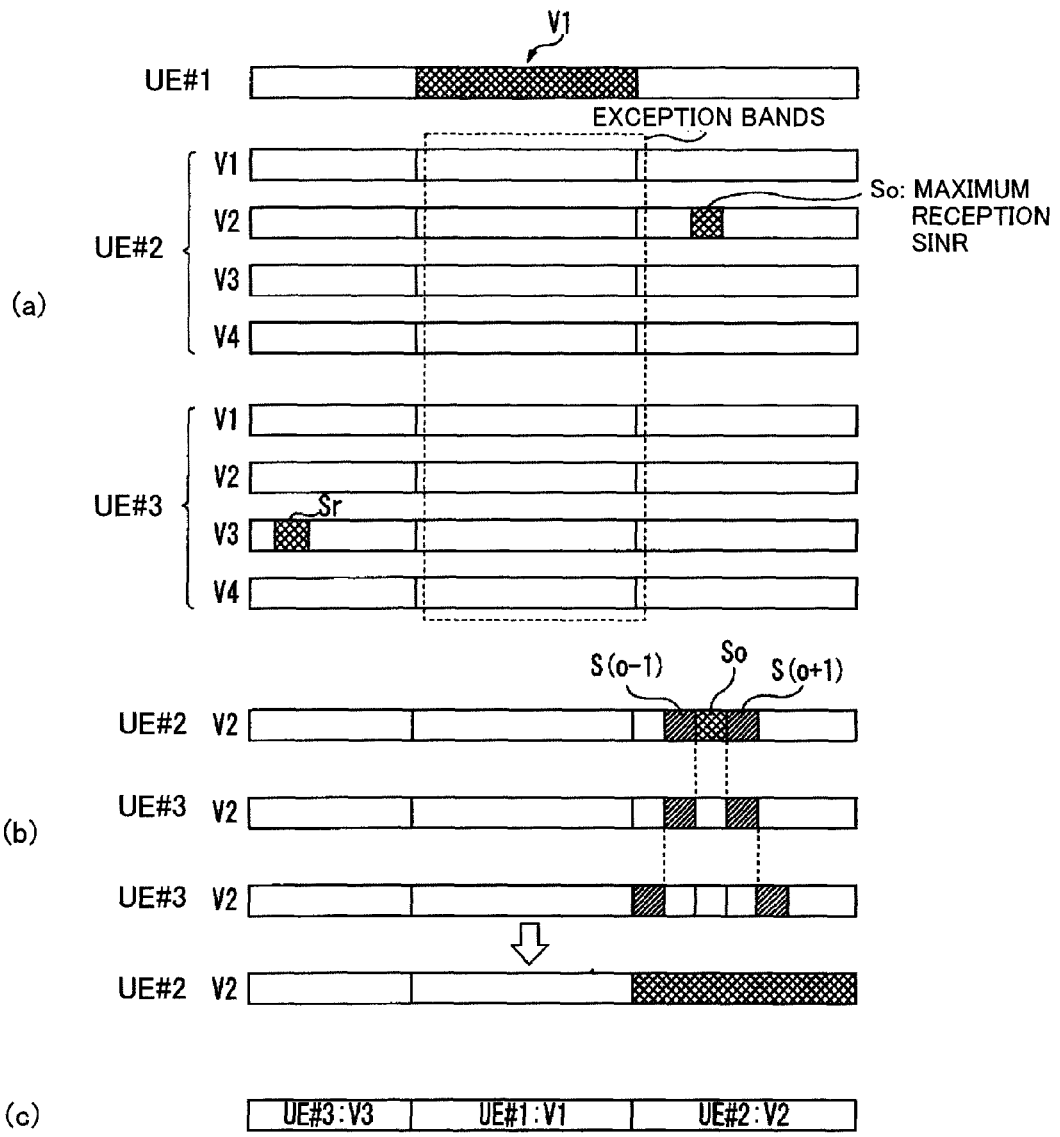
FIG. 11 is a view illustrating a process of assigning a band and a precoding weight to another user equipment after the process of FIG. 10.

FIGS. 9 to 11 are conceptual views of the precoding method of selecting from precoding weights and bands of each user equipment based on the reception SINRs of each resource block (sub-band) for predetermined plural precoding weights. The user equipment UE and the base station apparatus Node B have a codebook consisting of indexes of predetermined plural precoding weights. Here, in order to clarify correspondence between the predetermined precoding weights and the indexes stored in the codebook, the precoding weights and the indexes are explained by way of the same reference numerals.

The base station apparatus Node B calculates the reception SINR over the whole system bandwidth for precoding weights (V1, V2, V3, V4) of each user equipment UE and for each resource block (or sub-band). FIG. 9 illustrates calculation results of the reception SINRs over the system bandwidth for the precoding weights (V1, V2, V3, V4) of each of the user equipment UE#1 to UE#3. The maximum reception SINR is specified from all the resource blocks (or sub-bands) illustrated in FIG. 9. In FIG. 9, the resource block Sn shows the maximum reception SINR as the reception SINR to the precoding weight V1 of the user equipment UE#1.

As, for the user equipment UE#1, the maximum reception SINR is shown in reception SINRs for the precoding weight V1, including the other user equipment, the maximum reception SINR is expected to be realized by weighting of the transmission antenna of the user equipment UE#1 with the precoding weight V1. Then, the precoding weight V1 is selected for the bands to assign to the user equipment UE#1.

The bands to assign to the user equipment UE#1 are determined in the process illustrated in FIG. 10. Comparison is made with the reception SINR for the precoding weight V1 of the other user equipment UE#2. Specifically, the reception SINR of the resource block S(n−1) adjacent to the resource block Sn of the user equipment UE#1 is compared with the reception SINR for the precoding weight V1 of the other user equipment UE#2 of the resource block S(m−1) at the same position. When S(n−1)>S(m−1) is satisfied, the reception SINR is compared with the reception SINR for the precoding weight V1 for the other user equipment UE#3. Comparison is made with the reception SINR of the resource block at the same position as S(n−1) and if S(n−1) is larger, the band of the user equipment UE#1 is extended to S(n−1). In the same way, when S(n−2) is compared with S(m−2) and S(n−2)>S(m−2) is satisfied, the reception SINR is compared with the reception SINR of the resource block at the same position of the other user equipment UE#3. Then, if S(n−2) is larger, the band of the user equipment UE#1 is extended to S(n−2). Then, the resource block for comparison is shifted sequentially, and when the reception SINRs of the resource blocks of the other user equipment UE#2, UE#3 are larger than the reception SINR of the resource block of the user equipment UE#1, the band extension to the left in the figure of the user equipment UE#1 is stopped. Next, the band is also extended to the right in the figure in the same way. Here, regarding this band extension, extension to the left and extension to the right may be performed alternately or in another manner. As a result of repeating of the above-mentioned processing, as illustrated in FIG. 10, the zone where the precoding weight V1 is continuously selected becomes a band of the user equipment UE#1.

Next, the precoding weight and band are determined for each of the remaining user equipment UE#2 and UE#3. As illustrated in FIG. 11(a), the bands excluding the band assigned to the user equipment UE#1 (zone enclosed with the dashed line) becomes zones for band assignment to the other user equipment UE#2 and UE#3.

The maximum reception SINR is specified from reception SINRs of all resource blocks (not including the exception bands) for the precoding weights of the user equipment UE#2 and UE#3. Then, as V1 is already determined as the precoding weight of the user equipment UE#1, it is excluded. In FIG. 11(a), the resource block So for the precoding weight V2 of the user equipment UE#2 shows the maximum reception SINR. At this time, the precoding weight V2 is selected as the precoding weight of the user equipment UE#2.

Next, in the process illustrated in FIG. 11(b), the band to assign to the user equipment UE#2 is determined. That is, in the same way as the process of the band assignment to the user equipment UE#1 described above, the resource block So is used as a start point, and comparison is made sequentially with the reception SINR of the resource block at the same position of the other user equipment UE#3. Then, the resource blocks in the zone already determined as the band of the user equipment UE#1 are excluded from comparison.

Finally, the maximum reception SINR is specified from resource blocks for precoding weights of the user equipment UE#3 in the zone excluding the bands assigned to the user equipment UE#1 and UE#2. In FIG. 11(a), the reception SINR of the resource block Sr for the precoding weight V3 is maximized. The precoding weight of the user equipment UE#3 is determined to be the precoding weight V3. As there is no remaining user equipment, there is no comparative block. Accordingly, the successive resource blocks excluding the bands assigned to the user equipment UE#1 and UE#2 are assigned as the band of the user equipment UE#3.

In the above-described process, as illustrated in FIG. 11(c), the bands are assigned to all of the user equipment UE#1 to UE#3 and the optimal precoding weights are selected respectively.

Here, the precoding weight may be determined again by, as illustrated in FIG. 11(c), selecting the precoding weight for each band assigned to the user equipment and performing second scheduling in consideration of the precoding weight.

After the precoding weight is determined for each of the user equipment UE#1, UE#2, UE#3, the index information of the precoding weight is transmitted to the user equipment on the downlink.

Figure 12:
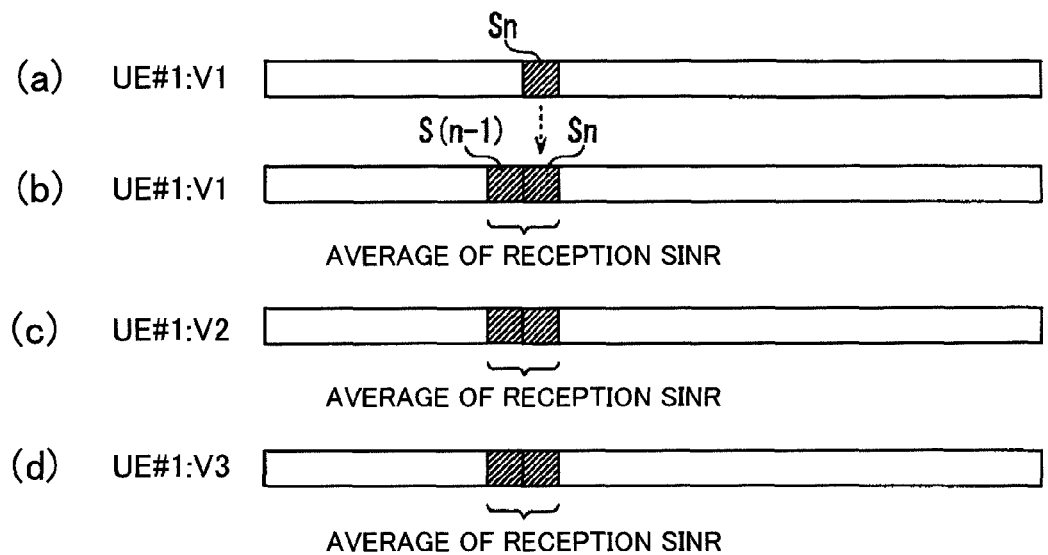
FIG. 12 is a view illustrating a process of assigning a band to a first user equipment.
Figure 13:
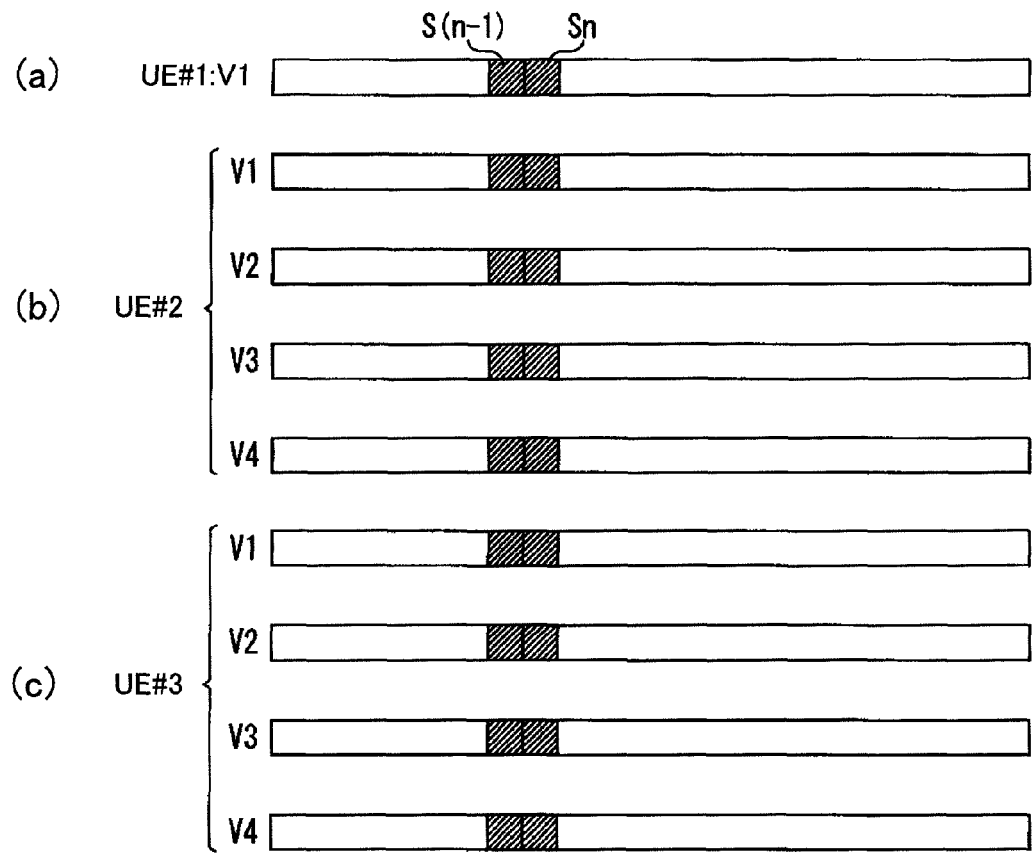
FIG. 13 is a view illustrating the resource blocks assigned to the first user equipment and corresponding resource blocks of another user equipment.

FIGS. 12 and 13 are conceptual views of the precoding method of selecting from predetermined precoding weights and bands of each user equipment based on the reception SINRs for the precoding weights at the respective resource blocks (sub-bands).

The user equipment UE and the base station apparatus Node B have a codebook consisting of indexes of predetermined plural precoding weights. The base station apparatus Node B calculates the reception SINR over the system bandwidth for the precoding weights (V1, V2, V3, V4) of each user equipment UE and for each resource block (or sub-band). FIG. 9 illustrates calculation results of the reception SINRs over the system bandwidth for the precoding weights (V1, V2, V3, V4) of each of the user equipment UE#1 to UE#3. The maximum reception SINR is specified from all resource blocks (sub-bands) shown in FIG. 9. In FIG. 9, the resource block Sn shows the maximum reception SINR as reception SINR of the precoding weight V1 of the user equipment UE#1.

As illustrated in FIG. 12(a), first the precoding weight V1 is temporarily selected for the user equipment UE#1. Then, as illustrated in FIG. 12(b), an average of reception SINR of the resource block Sn and the adjacent resource block S(n−1) is calculated. Meanwhile, as illustrated in FIG. 12(c), an average of reception SINRs for the precoding weight V2 of the user equipment UE#1 at the same positions as the resource blocks Sn, S(n−1) is obtained. The averages of the precoding weights V1 and V2 are compared with each other and if the average of V1 is larger than that of V2, the precoding weight for the user equipment UE#1 is maintained as V1. Next, as illustrated in FIG. 12(d), an average of reception SINR of precoding weight V3 for the user equipment UE#1 at the resource blocks located at the same positions as the resource blocks Sn, S(n−1) is obtained. The averages of the precoding weights V1 and V3 are compared with each other, and if the average of V1 is larger than that of V3, the precoding weight for the user equipment UE#1 is maintained as Next, as illustrated in FIGS. 13(a) and 13(b), the reception SINR is compared for the other user UE#2. An average of reception SINRs for the precoding weight V1 of the user equipment UE#2 at the resource blocks located at the same positions as the resource blocks Sn and S(n−1) is obtained. Then, the averages of the precoding weights V1 and V2 are compared, and if the average of V1 is larger than that of V2, the reception SINR is compared with the reception SINR of the precoding weight V3 of the user equipment UE#2 and then with the reception SINR of the precoding weight V4 of the user equipment UE#2.

When comparison between the user equipment UE#1 and UE#2 results in maintaining of the precoding weight V1 that is temporarily selected for the user equipment UE#1, the same processing is repeated on another user equipment UE#3 as comparison target. That is, as illustrated in FIGS. 13(a) and 13(c), an average of the reception SINRs for the precoding weight V1 of the user equipment UE#3 at resource blocks located at the same positions as the resource blocks Sn and S(n−1) is obtained. Then, the averages of the precoding weighs V1 and V2 are compared with each other and if the average of V1 is larger than that of V2, it is them compared with the reception SINR for the precoding weight V3 of the user equipment UE#3, and then with the reception SINR for the precoding weight V4 of the user equipment UE#3.

As described above, when the user equipment UE#1 and the other user equipment UE#2, UE#3 are compared and the previously selected temporary precoding weight V1 is determined to be maintained, the band to assign to the user equipment UE#1 is extended to the adjacent resource block S(n−2).

Figure 14:
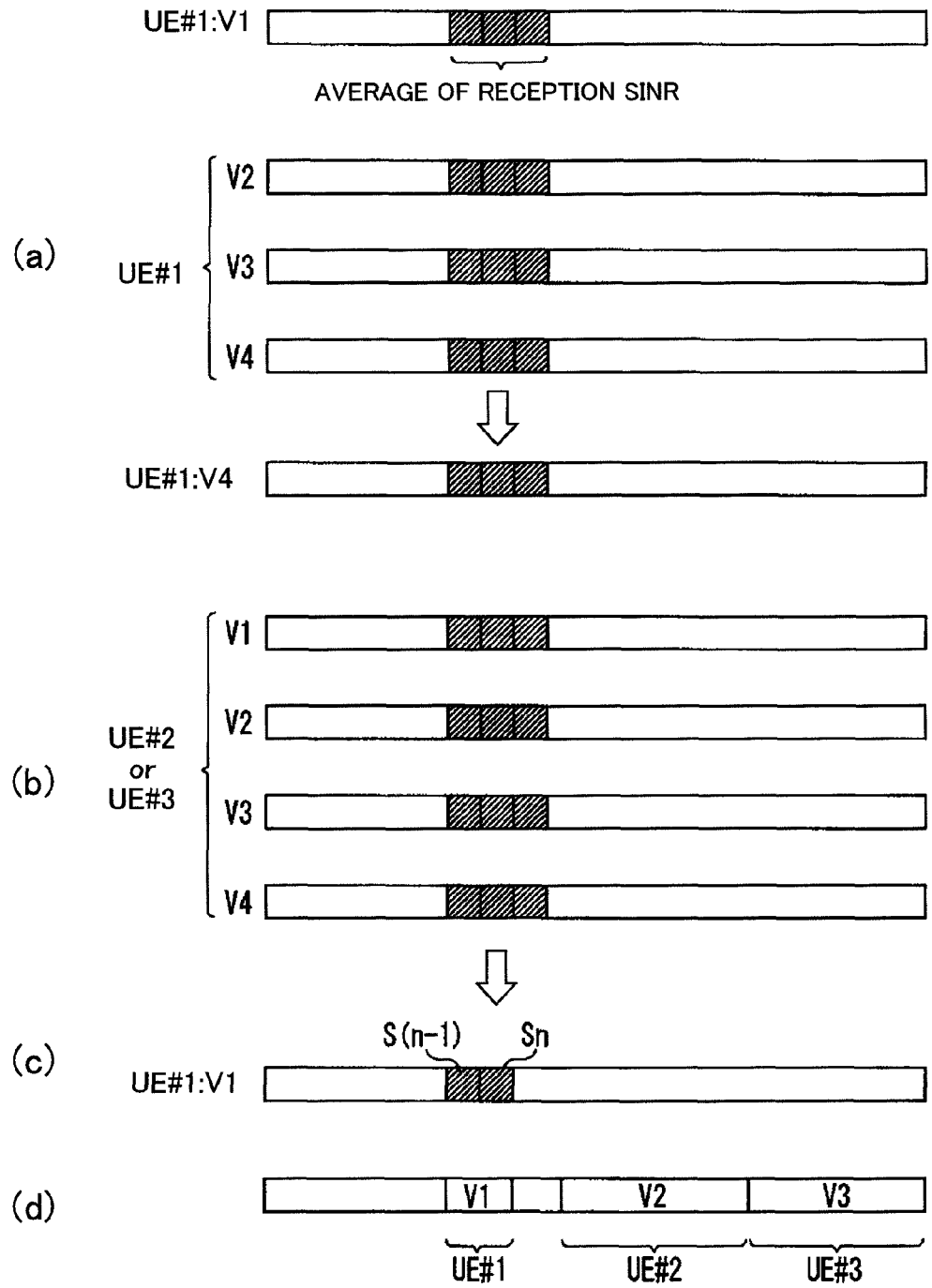
FIG. 14 is a view illustrating a process of extending bands while selecting a precoding weight, following the process illustrated in FIG. 13.

Next, as illustrated in FIG. 14, an average of reception SINRs at continuous three resource blocks Sn, S(n−1) and S(n−2) is obtained and compared with averages of resource blocks at the same positions for other precoding weights V2, V3 and V4. Consequently, if an average of reception SINR for the precoding weight V2, V3 or V4 is larger than the average of the reception SINR of the temporary selected precoding weight V1, the precoding weights of the whole resource blocks Sn, S(n−1) and S(n−2) are changed to new precoding weights. FIG. 14(a) illustrates the precoding weight V4 changed from the temporary selected precoding weight V1 of the resource blocks Sn, S(n−1) and S(n−2) for the user equipment UE#1. In the following process, the precoding weight V4 becomes a temporary selected precoding weight of the resource blocks Sn, S(n−1) and S(n−2) of the user equipment UE#1. In this way, when another precoding weight shows a higher average of reception SINR than that of the temporary selected precoding weight, the temporary selected precoding weight is replaced with the new precoding weight.

Next, as to each of precoding weights V1 to V4 of each user equipment UE#2 or UE3, an average of reception SINRs at the same positions of resource blocks Sn, S(n−1) and S(n−2) is obtained and compared with the average of reception SINR of the user equipment UE#1. Then, if the average of reception SINR of the user equipment UE#2 or UE#3 is detected to be larger than that of the user equipment UE#1, band extension is stopped. As a result, as illustrated in FIG. 14(c), the resource blocks Sn and S (n−1) are assigned to the user equipment UE#1 and the precoding weight V1 is selected for this band.

Band assignment to the other user equipment UE#2 and UE#3 is performed in the same manner as the user equipment UE#1 and the precoding weight is selected. FIG. 14(d) illustrates the precoding weight V2 selected for the band assigned to the user equipment UE#2 and the precoding weight V3 selected for the band assigned to the user equipment UE#3.

Here, the precoding weight may be determined again after, as illustrated in FIG. 14(d), the precoding weight is selected for each of bands assigned to the user equipment UE#1 to UE#3 and scheduling is performed again in consideration of the precoding weight.

After the precoding weights are determined on the respective user equipment UE#1 to UE#3, index information of the precoding weights is transmitted to the user equipment on the downlink.

Next description is made about an embodiment of the present invention, with reference to the drawings.

Figure 15:
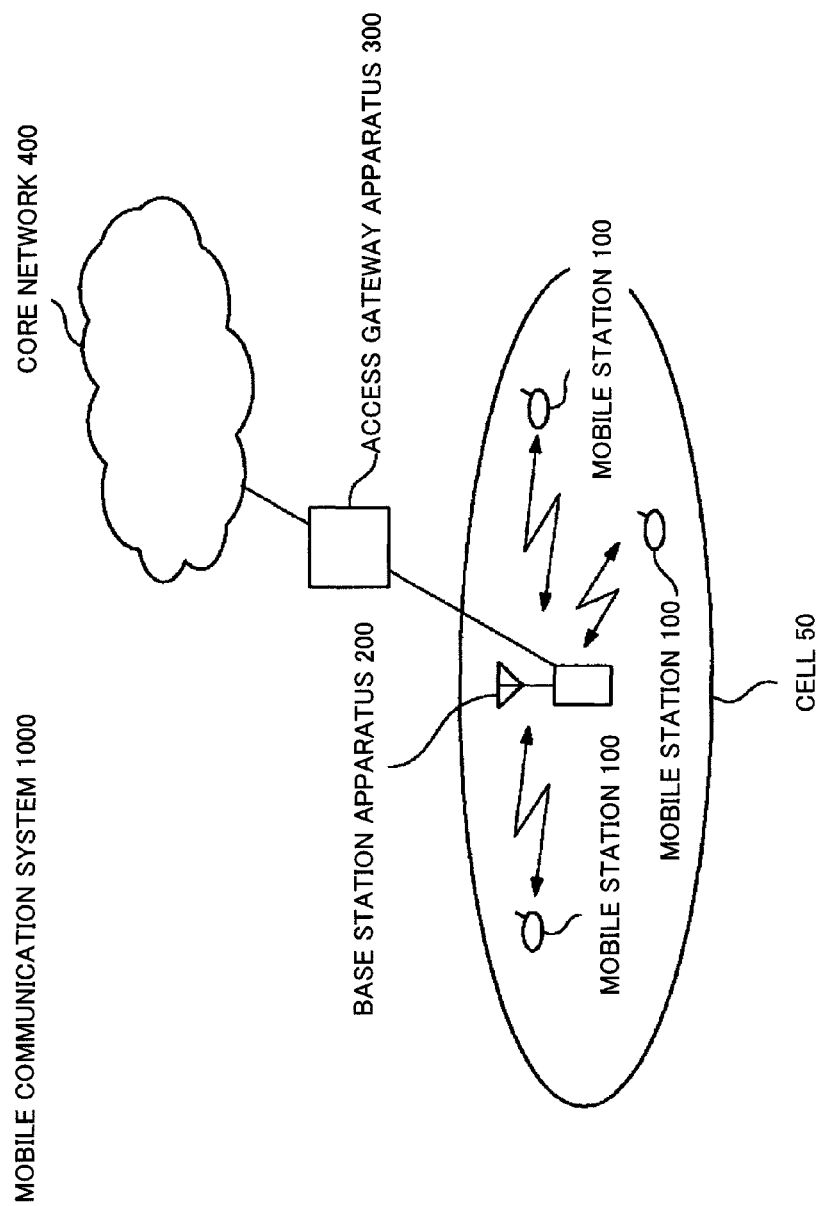
FIG. 15 is a block diagram of a configuration of a mobile communication system according to an embodiment of the present invention.

First description is made, with reference to FIG. 15, about a mobile communication system having a base station apparatus and a mobile station according to the embodiment of the present invention.

The mobile communication system $1000$ is a system to which, for example, Evolved UTRA and UTRAN (also named "Long Term Evolution" or "Super 3G") applies. The mobile communication system $1000$ has a base station apparatus $200$ and a plurality of mobile stations $100$ ($100_1$, $100_2$, $100_3$, . . . , $100_n$, n: an integer greater than zero). The base station apparatus $200$ is connected to a higher-level station, that is, access gateway device $300$ and the access gateway device $300$ is connected to a core network $400$. The mobile station $100_n$ performs communications with the base station apparatus $200$ in a cell $50$ via Evolved UTRA and UTRAN. Here, the access gateway device $300$ may be called MME/SGW (Mobility Management Entity/Serving Gateway).

The mobile stations ($100_1$, $100_2$, $100_3$, . . . , $100_n$) have the identical configurations, functions and status. Therefore, the following description is made by way of an example of mobile station $100n$ unless otherwise specified. For convenience of explanation, it is a mobile station that performs wireless communications with the base station apparatus, but more generally, it may be a user equipment UE that includes a fixed terminal and a mobile terminal.

In the mobile communication system $1000$, as a wireless access system, OFDMA (Orthogonal Frequency Division Multiple Access) is adopted to the downlink and SC-FDMA (Single Carrier Frequency Division Multiple Access) is adopted to the uplink. As described above, OFDMA is a multi carrier transmission system in which a frequency band is divided into narrower frequency bands (subcarriers) and data is mapped on each of the subcarriers to perform communications. SC-FDMA is a single carrier transmission system in which a system band is divided into one or plural continuous resource blocks for each of terminals and the plural terminals use different bands thereby to reduce interference between the terminals.

Here, explanation is given about a communication channel in Evolved UTRA and UTRAN.

For the downlink, a physical downlink shared channel (PDSCH) shared by the mobile station $100n$ and a physical downlink control channel (downlink L1/L2 control channel) are used. With use of the above-mentioned physical downlink shared channel, the user data, that is, normal data signals are transmitted. Besides, through the physical downlink control channel, precoding information for the uplink MIMO transmission, user ID for communications using the physical downlink shared channel, transport format information of the user data, that is, Downlink Scheduling Information and user ID for communication suing the physical uplink shared channel, transport format information of the user data, that is, Uplink Scheduling Grant are sent.

Besides, in the downlink, broadcast channels are transmitted such as Physical-Broadcast Channel (P-BCH) and Dynamic Broadcast Channel (D-BCH). Information transmitted by the above-mentioned P-BCH is Master Information Block (MIB) and information transmitted by the above-mentioned D-BCH is System Information Block (SIB). The above-mentioned D-BCH is subjected to mapping on the above-mentioned PDSCH and sent from the base station apparatus $200$ to the mobile station $100n$.

Used in the uplink are the physical uplink shared channel (PUSCH) shared with the mobile stations $100$ and the Physical Uplink Control Channel (PUCCH), which is a control channel of the uplink. The above-mentioned physical uplink shared channel is used to transmit user data, that is, normal data signals. And, the above-mentioned physical uplink control channel is used to transmit precoding information for the downlink MIMO transmission, acknowledgement information for the downlink shared channel, downlink Channel Quality Indicator (CQI) and the like.

Besides, in the uplink, a physical random access channel (PRACH) is defined for initial connection or the like. The mobile station 100 transmits a random access preamble in the above-mentioned PRACH.

Figure 16:
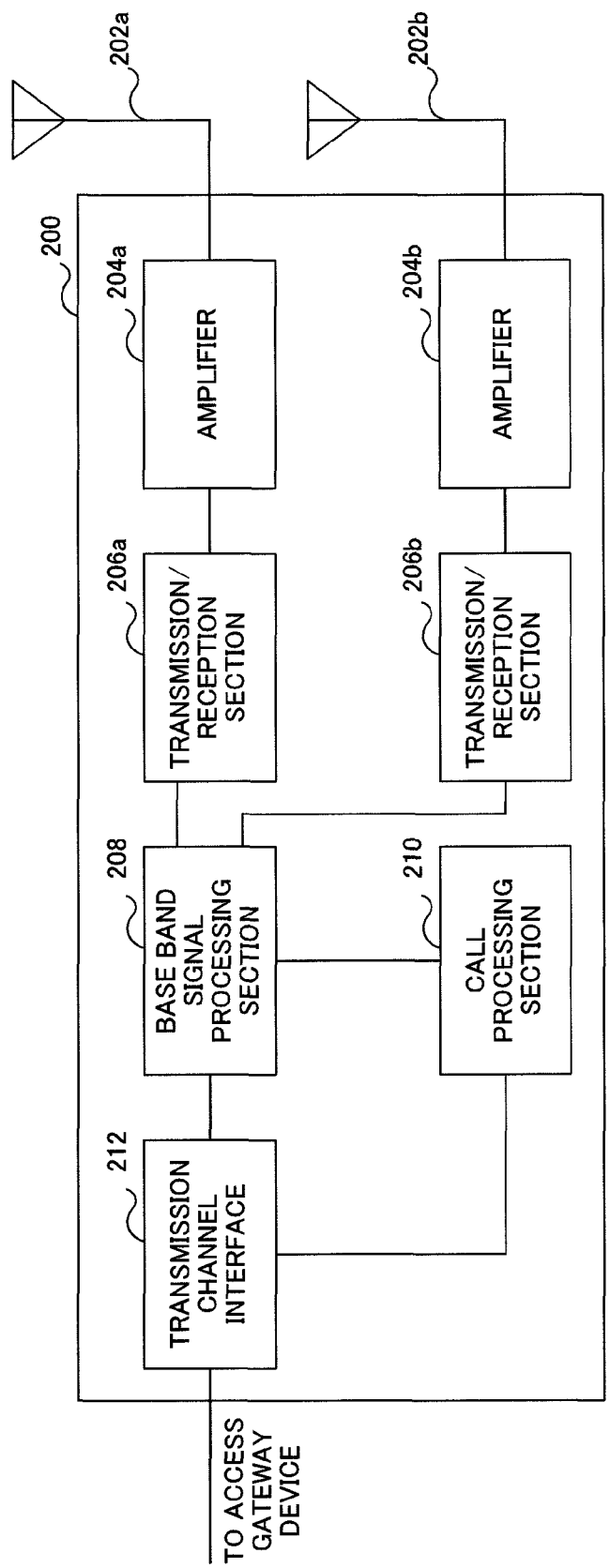
FIG. 16 is a partial block diagram illustrating a base station apparatus in the mobile communication system according to the embodiment of the present invention.

With reference to FIG. 16, the base station apparatus 200 according to the embodiment of the present invention is described below.

The base station apparatus 200 according to the embodiment has two transmission/reception antennas 202a and 202b for MIMO transmission, amplifiers 204a and 204b, transmission/reception sections 206a and 206b, a baseband signal processing section 208, a call processing section 210 and a transmission channel interface 212.

The user data to be transmitted from the base station apparatus 200 to the mobile station 100 on the downlink is input via the upper-level station positioned at the upper level of the base station apparatus 200, that is, the access gateway device 300, and then, the transmission channel interface 212, into the baseband signal processing section 208.

The baseband signal processing section 208 performs PDCP layer processing, division and join of user data, transmission processing of RLC (radio link control) layer such as RLC-ARQ (Automatic Repeat reQuest), transmission processing of MAC (Medium Access Control)-ARQ, for example, HARQ (Hybrid Automatic Repeat reQuest), scheduling, transmission format selection, channel encoding, IFFT (Inverse Fast Fourier Trans form) processing, and precoding processing on the signal and sends it to the transmission/reception sections 206a and 206b. Besides, a signal of physical downlink control channel that is the downlink control channel is also subjected to transmission processing such as Inverse Fast Fourier Transform and channel encoding and transferred to the transmission/reception sections 206a and 206b.

Further, the baseband signal processing section 208 notifies the mobile station 100 of control information for communications in the cell by the above-mentioned broadcast channel. The control information for communications in the cell contains, for example, system bandwidth in the uplink or downlink, resource block information assigned to the mobile station 100, precoding information for precoding in the mobile station 100, information of Root Sequence Index for generating a random access preamble signal in PRACH and the like. The precoding information may be transmitted on an independent control channel such as PHICH.

The transmission/reception sections 206a and 206b perform frequency conversion processing on the baseband signals that are output from the baseband signal processing section 208 after antenna-by-antenna precoding. In the frequency conversion processing, the baseband signals are converted into frequency-band signals. Then, the amplifiers 204a and 204b amplify the signals, which are transmitted from the transmission/reception antennas 202a and 202b.

Meanwhile, as to the data to be transmitted from the mobile station 100 to the base station apparatus 200 on the uplink, radio frequency signals received by the transmission/reception antennas 202a and 202b are amplified at the amplifiers 204a and 204b and subjected to frequency conversion at the transmission/reception sections 206a and 206b into the baseband signals. The baseband signals are then input to the baseband signal processing section 208.

The baseband signal processing section 208 performs FFT processing, IDFT processing, error correction decoding, reception processing of MAC-ARQ, reception processing of PDCP layer, RCL layer and the like on the user data contained in the input baseband signals and then, transfers the resultant signal via the transmission channel interface 212 to the access gateway device 300.

The call processing section 210 performs call processing such as release and setting of communication channels, status management of the base station apparatus 200 and management of radio resources.

Figure 17:
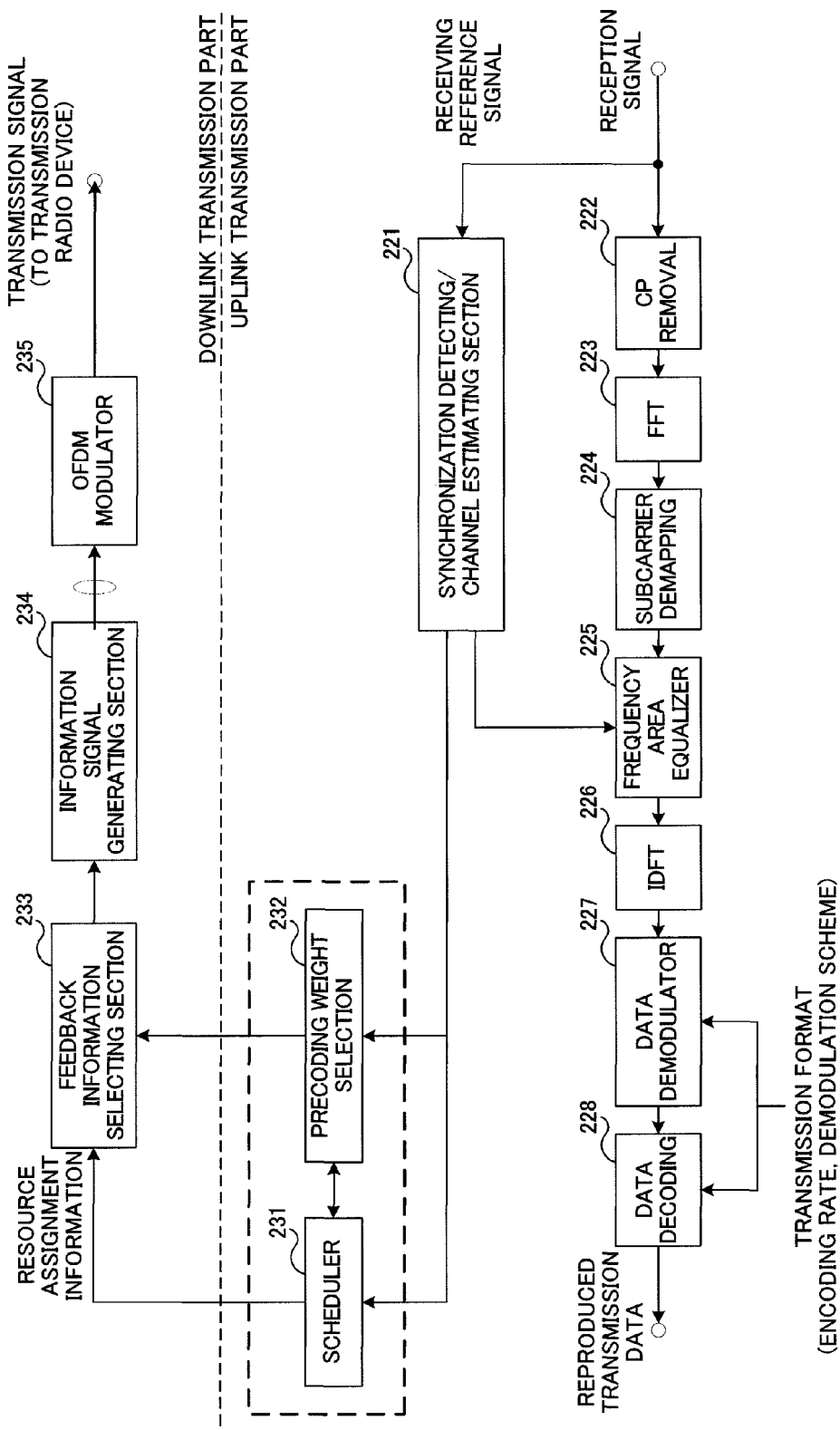
FIG. 17 is a block diagram illustrating a baseband signal processing section of the base station apparatus in the embodiment of the present invention.

FIG. 17 is a functional block diagram of the baseband signal processing section 208. A reference signal contained in the reception signal is input to a synchronization detecting/channel estimating section 221. The synchronization detecting/channel estimating section 221 uses the reception state of the reference signal received from the mobile station 100 as a basis to estimate the channel state of the uplink. Meanwhile, the reception signal input to the baseband signal processing section 208 is subjected to removal of a cycle prefix at the CP remover 222, which is added to the reception signal, and then, to Fourier transform at the Fast Fourier Transformer 223 so that it is converted into a frequency-band information signal. The reception signal which is converted to a signal of frequency-band information is demapped in a frequency area at a subcarrier demapping section 224. The subcarrier demapping section 224 performs demapping on the signal in conformity to mapping at the mobile station 100. A frequency domain equalizer 225 equalizes the reception signal based on a channel estimation value given from the synchronization detecting/channel estimating section 221. An Inverse Discrete Fourier Transformer 226 performs invert discrete Fourier transform on the reception signal to change from the frequency-domain signal back to a time-domain signal. A data demodulator 227 and a data decoder 228 reproduce transmission data based on transmission formats (encoding rate and modulation sheme).

A scheduler 231 uses the channel estimation value given from the synchronization detecting/channel estimating section 221 as a basis to determine assignment of uplink/downlink resources. A reference signal used to measure the quality that is a basis for scheduling needs to cover the band over all resource blocks (system band). The mobile station 100 transmits the reference signal for quality measurement over a wideband that is broader than the actually assigned resource blocks. The scheduler 231 can obtain the channel state information from a CQI measuring section (not shown). The CQI measuring section measures the channel state from the wideband reference signal for quality measurement received from the mobile station 100.

A precoding weight selecting section 232 determines a precoding weight for controlling the phase and/or amplitude of a transmission signal from each antenna in the mobile station 100 based on the uplink reception quality at resource blocks assigned to the mobile station 100. The process of determining the precoding weight may be any of the above-described precoding methods. Besides, it may have a codebook consisting of indexes of predetermined various precoding weights.

For example, as illustrated in FIG. 2, a shared precoding weight determined based on an average of reception SINRs only of resource blocks assigned to the mobile station 100 is selected. Or, as illustrated in FIG. 3, an optimal precoding weight for each of sub-bands that make up scheduled resource blocks is selected. Or, as illustrated in FIG. 4, L sub-bands that make up assigned resource blocks are divided into K blocks (K: fixed value) and an optimal precoding weight is selected for each of the blocks. Or, as illustrated in FIG. 5, an optimal precoding weight is selected for each cluster block. Or, any of these four precoding weight determining methods may be combined appropriately.

In addition, the scheduler 231 and the precoding weight selecting section 232 may combine scheduling and selecting of a precoding weight as described above and perform band assignment and selecting of the precoding weight in a coordinated fashion.

For example, as illustrated in FIG. 6, the scheduler 231 performs first scheduling without consideration of a precoding weight and the precoding weight selecting section 232 selects an optimal precoding weight for each band assigned to each mobile station by scheduling. In the following process, the scheduler 231 and the precoding weight selecting section 232 exchange information and repeat scheduling and selecting of the precoding weight thereby to determine an optimal precoding weight.

In addition, as illustrated in FIG. 7, the precoding weight selecting section 232 first determines a shared precoding weight over the whole system bandwidth by averaging of reception SINRs of the whole system bandwidth for each mobile station and then, the scheduler 231 performs scheduling in consideration of the precoding weight.

Further, as illustrated in FIG. 8, the precoding weight selecting section 232 selects a precoding weight for each resource block or sub-band in the whole system bandwidth on a mobile station basis and then, the scheduler 231 performs scheduling in consideration of the selected precoding weight. Next, the precoding weight selecting section 232 selects an optimal precoding weight if plural precoding weights are multiplexed on the band assigned on a mobile station basis.

Furthermore, as illustrated in FIGS. 9 to 11, the precoding weight selecting section 232 selects a precoding weight of a resource block corresponding to the maximum reception SINR as the precoding weight of the mobile station. Starting with the resource block of the maximum SINR, the scheduler 231 compares this reception SINR with the reception SINR of an adjacent resource block and with the reception SINR of corresponding resource blocks of other mobile stations, sequentially extends and define the band.

Furthermore, as illustrated in FIGS. 12 to 14, the reception SINR of each of resource blocks (or sub-bands) corresponding to predetermined various precoding weights is used to select from the precoding weights and bands for each mobile station.

A feedback information selecting section 233 selects how much precoding information to feed back finally from precoding weights selected by the precoding weight selecting section 232. The precoding information selected by the feedback information selecting section 233 is input to an information signal generating section 234 as feedback information. The information signal generating section 234 receives the feedback information and resource assignment information to the mobile stations 100. Two signals each containing the feedback information and resource assignment information are generated and input to an OFDM modulator 235. The OFDM modulator 235 performs OFDM modulation on the two signals containing the feedback information and resource assignment information and transmits them to the transmission/reception sections 206a and 206b.

Figure 18:
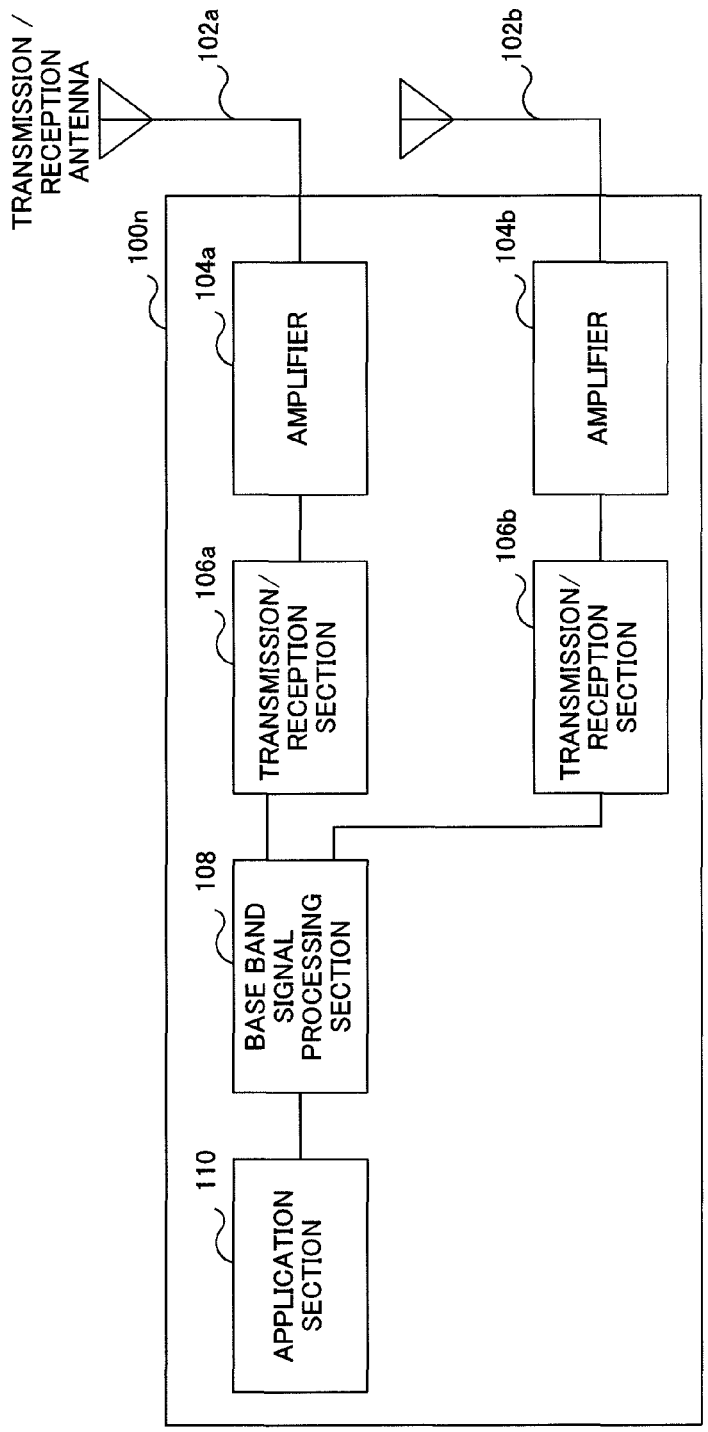
FIG. 18 is a partial block diagram illustrating a mobile station in the mobile communication system according to the embodiment of the present invention.

With reference to FIG. 18, the mobile station 100 according to the example of the present invention is explained below. In this figure, the mobile station 100 has two transmission/reception antennas 102a, 102b, amplifiers 104a, 104b, transmission/reception sections 106a, 106b, a baseband signal processing section 108 and an application section 110.

For the downlink data, radio frequency signals received by the two transmission/reception antennas 102a and 102b are amplified by the amplifiers 104a and 104b and then, frequency-converted into baseband signals at the transmission/reception sections 106a and 106b. These baseband signals are subjected to FFT processing, error correction decoding, reception processing of ARQ and the like at the baseband signal processing section 108. In the above-mentioned downlink data, downlink user data is transferred the application section 110. The application section 110 performs processing on upper layers of the physical and MAC layers. And, in the above-mentioned downlink data, broadcast information is also transferred to the application section 110.

Meanwhile, as to uplink user data, the application section 110 inputs it to the baseband signal processing section 108. The baseband signal processing section 108 performs transmission processing of Hybrid ARQ (H-ARQ), channel encoding, precoding, DFT processing, IFFT processing and the like on the data, which data is then transferred to the transmission/reception sections 106a and 106b. The transmission/reception sections 106a and 106b receive the baseband signals from the baseband signal processing section 108 and perform frequency conversion on the signals so that the signals are converted to radio frequency band signals. Then, the signals are amplified by the amplifiers 104a and 104b and transmitted by the transmission/reception antennas 102a and 102b.

Figure 19:
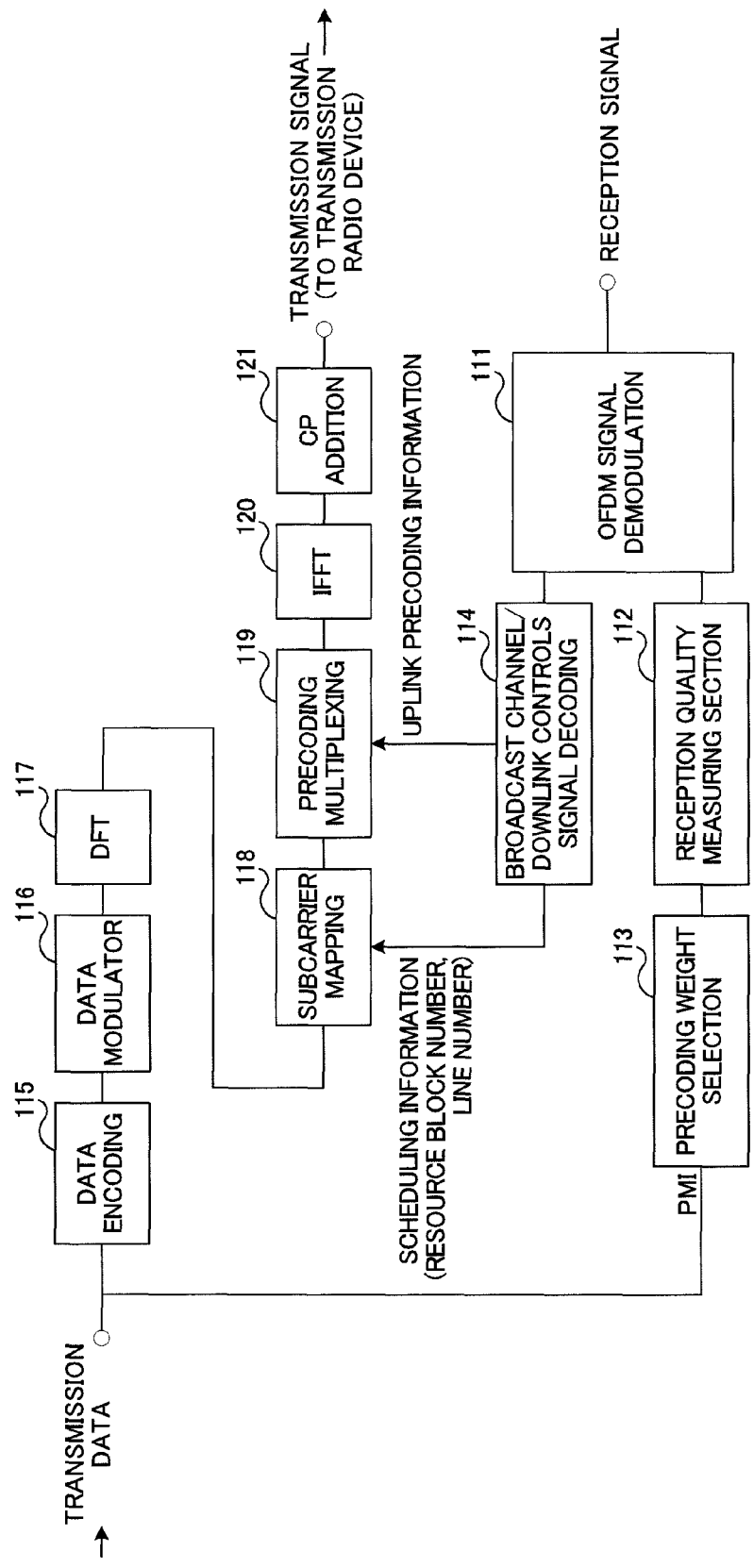
FIG. 19 is a block diagram illustrating a baseband signal processing section of the mobile station in the embodiment of the present invention.

FIG. 19 is a functional block diagram of the baseband signal processing section 108. The reception signals output from the transmission/reception sections 106a and 106b are demodulated by an OFDM signal demodulator 111. A reception quality measuring section 112 measures reception quality based on the reception state of the received reference signal. It measures the reception quality of channels over a wideband used in the downlink OFDM communication by the base station 200. The reception quality information of each channel is given to a precoding weight selecting section 113. The precoding weight selecting section 113 obtains an average of reception quality over the system bandwidth, for example, and selects one precoding weight, or divides the system bandwidth into plural sub-bands and selects an optimal precoding weight for each sub-band. Like the base station apparatus, it may have a codebook consisting of plural precoding weights. Besides, the uplink precoding information and scheduling information are decoded from the OFDM-demodulated downlink reception signals.

A data encoder 115 encodes transmission data given from the application section 110. Besides, the data encoder 115 encodes various control signals containing precoding information given from the precoding weight selecting section 113. The control signal may include transmission format of the uplink data signals (modulation scheme, data size and the like), uplink transmission power, downlink data transmission check information (ACK/NACK), the downlink Channel Quality Indicator (CQI) and the like. The transmission data and the control signal encoded at the data encoder 115 are modulated at a data modulator 116 and subjected to inverse Fourier transform at the inverse Fourier transformer 117 so that the chronological information is converted to the frequency a-domain information. A subcarrier mapping section 118 performs mapping in a frequency-domain based on the scheduling information.

The precoding multiplexer 119 uses the precoding information decoded at a broadcast channel/downlink controls signal decoder 114 as a basis to perform phase shift and/or amplitude control on the transmission on an antenna basis (weighting of each transmission antenna by precoding). With this processing, the reception power of the reception signal at the base station 200 is increased thereby to improve the throughput performance. After precoding, the transmission signal is subjected to inverse fast Fourier transform at the Inverse Fast Fourier Transformer 120 so that the frequency band signal is converted into a time-domain signal. A cyclic prefix adding section 121 adds a Cyclic Prefix to the transmission signal. The Cyclic Prefix is used as a guard interval for absorbing a difference of reception timing between users at the base station and multipath transmission delay. The transmission signal to which Cyclic Prefix is added is sent to the transmission/reception sections 106*a* and 106*b*.

In this way, according to this embodiment, as the base station apparatus 200 determines the precoding weight of a transmission signal for uplink multi-antenna transmission only based on the resource block determined for the mobile station 100 and the bandwidth of the resource block is much narrower than the system band, it becomes possible to reduce feedback information for precoding while preventing degrading of the throughput performance.

The above description is made on the assumption of the uplink SC-FDMA, however, the present invention may be applicable any of OFDM, Clustered DFT-s-OFDM and Hybrid Access.

Up to this point, the present invention has been described in detail using the above-mentioned embodiment. However, it is clear for a person skilled in the art that the present invention is not limited to the embodiment explained here. The present invention may be embodied in various modified forms without departing from the purpose and scope of the present invention defined by the claims. Therefore, the present description has been made only for the illustrative purposes and is not intended for imposing limitations to the present invention.

The invention claimed is:

1. A base station apparatus comprising:
a scheduler configured to assign a band made up of one or continuous resource blocks on a system bandwidth to each user equipment;
a PMI (Precoding Matrix Indicator) determining section configured to determine a PMI that is used in weighting of a transmission antenna of the user equipment for every band assigned to the user equipment; and
a transmitter configured to transmit the PMI determined by the PMI determining section to the user equipment,
wherein the PMI determining section determines a shared PMI by averaging of reception quality over the whole band assigned to the user equipment.

2. A base station apparatus comprising:
a scheduler configured to assign a band made up of one or continuous resource blocks on a system bandwidth to each user equipment;
a PMI (Precoding Matrix Indicator) determining section configured to determine a PMI that is used in weighting of a transmission antenna of the user equipment for every band assigned to the user equipment; and
a transmitter configured to transmit the PMI determined by the PMI determining section to the user equipment,
wherein the PMI determining section divides the whole band assigned to the user equipment into a plurality of blocks and determines the PMI for each of the blocks.

3. A base station apparatus comprising:
a scheduler configured to assign a band made up of one or continuous resource blocks on a system bandwidth to each user equipment;
a PMI (Precoding Matrix Indicator) determining section configured to determine a PMI that is used in weighting of a transmission antenna of the user equipment for every band assigned to the user equipment; and
a transmitter configured to transmit the PMI determined by the PMI determining section to the user equipment,
wherein, when the resource blocks of the band assigned to the user equipment include a plurality of cluster blocks having mutually separated sub-bands, the PMI determining section determines the PMI for each of the cluster blocks.

4. A base station apparatus comprising:
a scheduler configured to assign a band made up of one or continuous resource blocks on a system bandwidth to each user equipment;
a PMI (Precoding Matrix Indicator) determining section configured to determine a PMI that is used in weighting of a transmission antenna of the user equipment for every band assigned to the user equipment; and
a transmitter configured to transmit the PMI determined by the PMI determining section to the user equipment,
wherein
the scheduler assigns a band again to the user equipment based on weighting of the transmission antenna with the PMI determined by the PMI determining section, and
the PMI determining section determines a PMI again for the band of the user equipment assigned again by the scheduler.

5. A base station apparatus comprising:
a scheduler configured to assign a band made up of one or continuous resource blocks on a system bandwidth to each user equipment;
a PMI (Precoding Matrix Indicator) determining section configured to determine a PMI that is used in weighting of a transmission antenna of the user equipment for every band assigned to the user equipment; and
a transmitter configured to transmit the PMI determined by the PMI determining section to the user equipment,
wherein,
the PMI determining section determines the PMI by averaging reception quality of the whole system bandwidth for the user equipment before the scheduler assigns the band to the user equipment,
the scheduler assigns the band to the user equipment based on weighting of the transmission antenna with the PMI of the whole system bandwidth determined by the PMI determining section, and
the PMI determining section determines a PMI again for the band of the user equipment assigned by the scheduler.

6. A base station apparatus comprising:
a scheduler configured to assign a band made up of one or continuous resource blocks on a system bandwidth to each user equipment;
a PMI (Precoding Matrix Indicator) determining section configured to determine a PMI that is used in weighting of a transmission antenna of the user equipment for every band assigned to the user equipment; and
a transmitter configured to transmit the PMI determined by the PMI determining section to the user equipment,
wherein,
the PMI determining section determines the PMI for each of the resource blocks or sub-bands over the whole system bandwidth for the user equipment before the scheduler assigns the band to the user equipment,
the scheduler assigns the band to the user equipment based on weighting of the transmission antenna with the PMI of the resource block or sub-band determined by the PMI determining section, and the PMI determining section determines a PMI again for the band of the user equipment assigned by the scheduler.

7. A base station apparatus comprising:

a scheduler configured to assign a band made up of one or continuous resource blocks on a system bandwidth to each user equipment;

a PMI (Precoding Matrix Indicator) determining section configured to determine a PMI that is used in weighting of a transmission antenna of the user equipment for every band assigned to the user equipment; and a transmitter configured to transmit the PMI determined by the PMI determining section to the user equipment, wherein the base station apparatus has a codebook defining various PMIs used in weighting of the transmission antenna of the user equipment in advance, and the PMI determining section:

calculates, for each of the resource blocks, reception quality for each of the PMIs of the user equipment;

when the user equipment has a resource block of best reception quality, selects a corresponding PMI of the resource block for the user equipment;

sequentially compares reception quality of each of adjacent resource blocks to the resource block of best reception quality with reception quality of a resource block at an identical position of an other user equipment;

when the adjacent resource block shows better reception quality than the reception quality of the resource block of the other user equipment, assigns the resource block as the band to the user equipment;

repeats above-described processing, excluding a frequency range of the resource blocks already assigned, to determine a PMI and a band to assign to the other user equipment; and notifies the scheduler of band information assigned to the user equipment.

8. A base station apparatus comprising:

a scheduler configured to assign a band made up of one or continuous resource blocks on a system bandwidth to each user equipment;

a PMI (Precoding Matrix Indicator) determining section configured to determine a PMI that is used in weighting of a transmission antenna of the user equipment for every band assigned to the user equipment; and a transmitter configured to transmit the PMI determined by the PMI determining section to the user equipment, wherein the base station apparatus has a codebook defining various PMIs used in weighting of the transmission antenna of the user equipment in advance, and the PMI determining section:

calculates, for each of the resource blocks, reception quality for each of the PMIs of the user equipment;

when the user equipment has a resource block of best reception quality, temporarily selects a corresponding PMI of the resource block for the user equipment;

sequentially extends a comparison target range from the resource block of best reception quality to each of adjacent resource blocks;

compares reception quality in the comparison target range with the temporarily selected PMI and reception quality at an identical resource block in the comparison target range with an other PMI;

when the other PMI shows better reception quality than the reception quality with the temporarily selected PMI, changes the temporarily selected PMI to the other PMI;

when a range shows better reception quality of the reception quality of the resource block of an other user equipment, assigns the range as a band of the user equipment;

repeats above-described processing, excluding a frequency range of the resource blocks already assigned, to determine a PMI and a band to assign to the other user equipment; and notifies the scheduler of band information assigned to the user equipment.

9. A precoding method in uplink multi-antenna transmission comprising the steps of:

adaptively determining a resource block used in wireless communications with each user equipment;

determining a PMI (Precoding Matrix Indicator) for controlling phase and/or amplitude of a transmission signal for each antenna of the user equipment, based on reception quality of uplink in the resource block determined for the user equipment; and transmitting the PMI determined to the user equipment;

wherein the PMI determining section determines a shared PMI by averaging of reception quality over the whole band assigned to the user equipment.

* * * * *